United States Patent
Peters et al.

(10) Patent No.: US 9,117,199 B2
(45) Date of Patent: Aug. 25, 2015

(54) CONVERSATION GRAPHICAL USER INTERFACE (GUI)

(71) Applicants: Johan Christiaan Peters, Sankt Leon-Rot (DE); Vera Legisa, Karlsruhe (DE); Udo Arend, Heidelberg (DE)

(72) Inventors: Johan Christiaan Peters, Sankt Leon-Rot (DE); Vera Legisa, Karlsruhe (DE); Udo Arend, Heidelberg (DE)

(73) Assignee: SAP SE, Walldorf (DE)

( * ) Notice: Subject to any disclaimer, the term of this patent is extended or adjusted under 35 U.S.C. 154(b) by 274 days.

(21) Appl. No.: 13/675,518

(22) Filed: Nov. 13, 2012

(65) Prior Publication Data

US 2014/0137003 A1    May 15, 2014

(51) Int. Cl.
  *G06Q 10/10*    (2012.01)
  *G06F 3/0481*   (2013.01)

(52) U.S. Cl.
  CPC ............ *G06Q 10/103* (2013.01); *G06Q 10/101* (2013.01); *G06Q 10/107* (2013.01)

(58) Field of Classification Search
  None
  See application file for complete search history.

(56) References Cited

U.S. PATENT DOCUMENTS

| | | | |
|---|---|---|---|
| 6,535,230 B1 * | 3/2003 | Celik | 715/769 |
| 6,678,714 B1 * | 1/2004 | Olapurath et al. | 718/104 |
| 7,587,677 B2 * | 9/2009 | Yamamoto et al. | 715/752 |
| 8,352,859 B2 * | 1/2013 | Zuckerberg et al. | 715/273 |
| 2004/0267871 A1 * | 12/2004 | Pratley et al. | 709/200 |
| 2005/0097440 A1 * | 5/2005 | Lusk et al. | 715/500.1 |
| 2011/0154342 A1 * | 6/2011 | Logan et al. | 718/101 |
| 2012/0151377 A1 * | 6/2012 | Schultz et al. | 715/751 |
| 2013/0055161 A1 * | 2/2013 | Adams et al. | 715/811 |
| 2013/0185348 A1 * | 7/2013 | Hall et al. | 709/203 |

OTHER PUBLICATIONS

"Community & Help Pages", https://support.box.com/entries/20361366-tasks, Aug. 12, 2011, 1 page.
"Google Wave Drips With Ambition. A New Communication Platform for a New Web", Google, May 28, 2009, 26 pages.
"File sharing, meeting workspace, collaboration: WebEx Meeting Spaces", retrieved on Sep. 6, 2012 from www.webex.com/products/web-conferencing/meeting-spaces.html, 2 pages.

* cited by examiner

*Primary Examiner* — Phenuel Salomon
*Assistant Examiner* — Mahelet Shiberou
(74) *Attorney, Agent, or Firm* — Brake Hughes Bellermann LLP

(57) ABSTRACT

A conversation GUI may include a canvas, a feed section, and a process section. The canvas may present icons associated with documents uploaded by members of a conversation associated with the GUI, the members including a local user of the local computing system and remote users of remote computing systems, the canvas being located in a fixed section of the conversation GUI. The feed section may present messages sent by the local user and by the remote members. The process may be separate from the canvas and the feed section and include at least a first task and a second task associated with a specified process. A computing system may, upon completion of the first task, send a message to the local user indicating that the first task is complete and the second task is to be performed.

20 Claims, 15 Drawing Sheets

CONVERSATION GRAPHICAL USER INTERFACE (GUI)

TECHNICAL FIELD

This description relates to graphical user interfaces for facilitating discussion or conversation about tasks and/or documents.

BACKGROUND

Multiple users may collaborate on a project. The project may include multiple tasks that need to be completed, and may involve multiple documents. It may be difficult to keep track of which tasks have been completed and the status of the documents.

SUMMARY

According to one general aspect, a non-transitory computer-readable storage medium may include instructions stored thereon that, when executed by at least one processor, are configured to cause a local computing system to at least generate a conversation graphical user interface (GUI). The conversation GUI may include a canvas, a feed section, and a process section. The canvas may be configured to present icons associated with documents uploaded by members of a conversation associated with the GUI, the members including a local user of the local computing system and remote users of remote computing systems, the canvas being located in a fixed section of the conversation GUI. The feed section may be configured to present messages sent by the local user and by the remote members. The process section may be separate from the canvas and the feed section and include at least a first task and a second task associated with a specified process. The instructions may also be configured to cause the local computing system to, upon completion of the first task, send a message to the local user indicating that the first task is complete and the second task is to be performed.

According to another general aspect, a non-transitory computer-readable storage medium may include instructions stored thereon that, when executed by at least one processor, are configured to cause a computing system to at least generate a conversation graphical user interface (GUI). The conversation GUI may include a people section, a feed section, a process section, and a canvas. The people section may indicate members of a conversation, the members including a local user of the conversation GUI and remote members. The feed section may present messages associated with the conversation, the messages being generated by the local user or by the remote members, the feed section being separate from the people section. The process section may indicate at least a first task and a second task associated with the conversation, the process section being separate from the people section and the feed section, the process section indicating that the first task must be completed before the second task. The canvas may present icons associated with documents associated with the conversation, the canvas being separate from the people section, the feed section, and the process section.

According to another general aspect, a non-transitory computer-readable storage medium may include instructions stored thereon that, when executed by at least one processor, are configured to cause a server to at least generate a conversation in response to receiving a new conversation message from a local client, send new conversation messages to remote clients in response to receiving a members message from the local client, and send task messages to the remote clients in response to receiving a request process message from the local client, the tasks messages indicating relationships between at least a first task and a second task based on a predefined process indicated by the request process message.

The details of one or more implementations are set forth in the accompanying drawings and the description below. Other features will be apparent from the description and drawings, and from the claims.

DETAILED DESCRIPTION

Figure 1A:
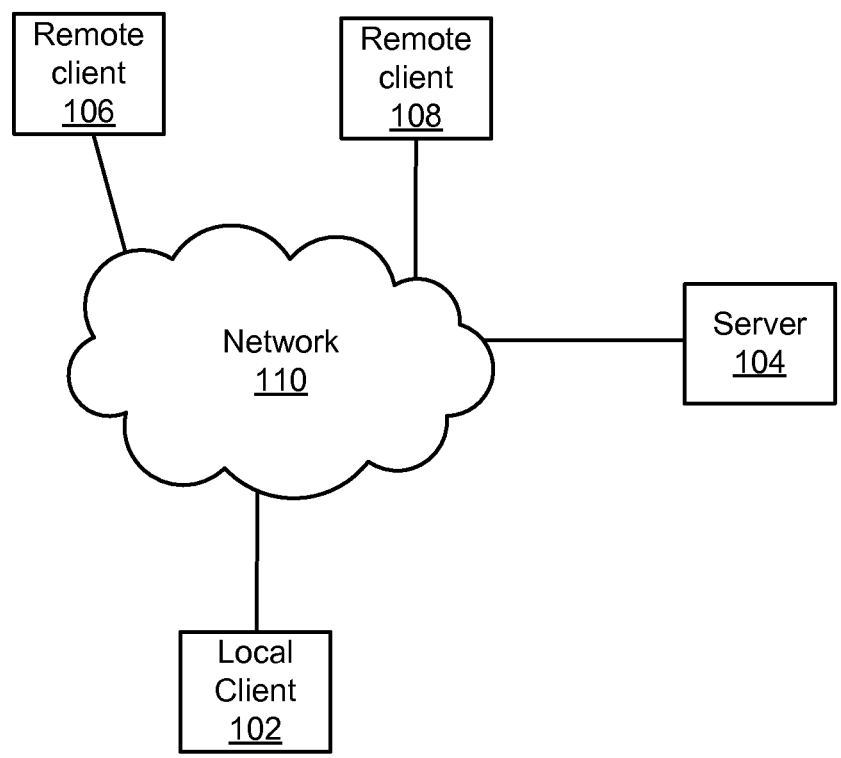
FIG. 1A is a diagram showing clients and a server which may perform the functions and processes described herein according to an example implementation.

FIG. 1A is a diagram showing clients 102, 106, 108 and a server 104 which may perform the functions and processes described herein according to an example implementation. Users may interact with the clients 102, 106, 108 locally. The clients 102, 106, 108 may receive input from, and provide output to, the users, such as interaction with a conversation graphical user interface (GUI) displayed by the respective clients 102, 106, 108. The conversation GUI, shown in FIGS. 7A, 7B, 7C, 7D, 7F, and 7G, may facilitate discussion or conversation ("conversation" hereinafter) between users of the clients 102, 106, 108, who may be considered members of the conversation. The conversation GUI may be implemented as a local application, within a web browser, or as an applet in response to an instruction from the remote server 104, according to example implementations.

The conversation may be structured based on one or more processes, which may be broken down into tasks. Messages in the conversation may be associated with one or more tasks of the process, or may be associated with the process in general. Messages may also be associated with documents. The documents may be associated with the conversation, and may be available to members or users associated with the conversation.

The conversation GUI may include a title section, a people section including a representation of the members of the conversation (who may include the users of the clients 102, 106, 108), a feed section showing messages posted by the members or posted in response to actions performed within the conversation, a process section which may include multiple tasks, and a canvas including the documents associated with the conversation. The server 104 may interact with each of the clients 102, 106, 108, receiving changes to the conversation from the users through a network 110 (which may include the Internet or another network such as a business intranet), updating the changes through the network, and propagating the changes to the clients 102, 106, 108 through the network 110. The local client 102 may upload data and messages to the server 104 via the network 110, and may receive data and messages from the server 104 via the network 110. The server 104 may store conversations based on input received from the clients 102, 106, 108, and provide updates to, or current states of, the conversation(s) to the clients 102, 106, 108. Or, in a distributed system, any or all of the clients 102, 106, 108 may perform functions of the server 104, and may store the present state of the conversation locally, according to an example implementation.

As used herein, the local client 102 may refer to a computing device interacting with a specific user, and the remote clients 106, 108 may refer to computing devices interacting with other users. The local client 102 may or may not be the device associated with the user who started or generated the conversation. However, while the present disclosure describes functions or operations performed by or with respect to the local client 102, any or all of the functions described with respect to the local client 102 may also be performed by the remote clients 106, 108. Also, while two remote clients 106, 108 and one local client 102 are shown in FIG. 1A, a conversation may include any number of users and associated clients. The users also need not have their own dedicated client devices, but may log into any client device using their username or other identifiers, and participate in the conversation.

Figure 1B:
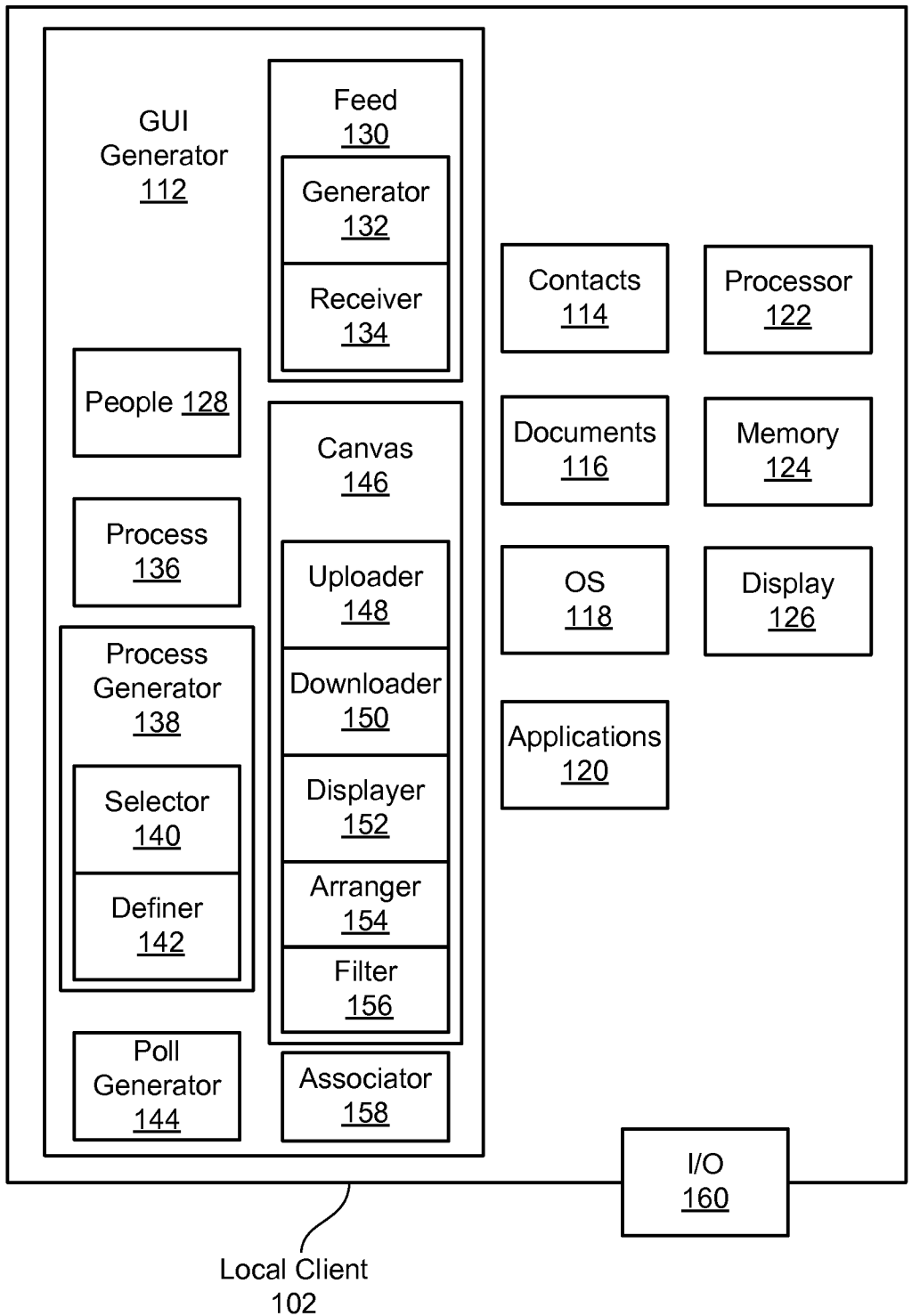
FIG. 1B is a diagram showing one of the clients according to an example implementation.

FIG. 1B is a diagram of the local client 102 according to an example embodiment. As discussed above, the functions described with respect to the local client 102 may also be performed by the remote clients 106, 108 shown in FIG. 1A.

The local client 102 may include a graphical user interface (GUI) generator 112. The GUI generator 112 may generate a conversation GUI for presentation to the user. Examples of the conversation GUI are shown in FIGS. 7A 7B, 7C, 7D, 7F, and 7G.

The GUI generator 112 may include a people engine 128. The people engine 128 may maintain and present the people or contacts who are members of the conversation. A user of the local client 102 and/or remote clients 106, 108 may add people or contacts to the conversation. The user may add the people or contacts to the conversation by, for example, dragging contact icons onto the conversation GUI generated by the conversation GUI generator 112. The user may also add the people or contacts by selecting the people or contacts from a list presented by the conversation GUI. The people engine 128 of the GUI generator 112 may present the list in response to the user selecting a button or other input associated with adding members to the conversation.

Persons may be notified that they have been added as members of the conversation. For example, the local client 102 may notify the server 104 of new persons added to the conversation, and the server 104 may respond by updating the members of the conversation and notifying the clients 102, 106, 108 that their associated users have been added to the conversation.

The GUI generator 112 may include a feed engine 130. The feed engine 130 may generate a feed section of the conversation GUI which displays messages that are part of the conversation. The messages may be posted by users and displayed to the other members of the conversation. The feed engine 130 may, for example, show messages posted by the local user of the local client 102 as well as messages posted by the remote users of the remote clients 106, 108. The members of the conversation may post messages in association with tasks of the conversation, in association with documents associated with the conversation, or without association to any particular task or document. The members may post messages to all other members of the conversation, in which case the messages may be displayed in the feed section of all the members' conversation GUIs, or only to specified members of the conversation, in which case the messages may be displayed in the feed section of only the specified members' conversation GUIs.

The feed engine 130 may include a message generator 132 and a message receiver 134. The message generator 132 may generate messages. For example, a user of the local client 102 may type a message into the conversation GUI, and the message generator 132 may generate a corresponding message, which may be a string variable. The message may be associated with a task or document, depending on selections of the user. The message generator 132 may send the corresponding message, and any association with a task or document, to the server 104.

The message receiver 134 may receive messages from the server 104 which were generated by other clients 106, 108, from the user of the local client 102, from other members of the conversation, and from other components or modules of the GUI generator 112 and/or local client 102. The received message(s) may include a string variable, and may include any associations with tasks of documents associated with the conversation. The message receiver 134 may, in response to receiving the messages, cause the messages to be displayed by the feed section of the conversation GUI generated by the GUI generator 112. The feed section may also indicate any association between the received messages and tasks or documents, or may respond to filtering selections, or selections of tasks or documents, by hiding messages that are not associated with the selected task or document, according to example implementations.

The message receiver 134 may also receive messages from a process engine 136, described below, regarding a state of processes and/or required next step(s) or task(s). The feed engine 130 may respond to the message receiver 134 receiving messages from the process engine regarding states of processes and required next step(s) or task(s) by causing the feed section of the conversation GUI to present the required next step(s) or task(s) to the user.

The message receiver 134 may also receive messages from a canvas engine 146, described below. The message receiver 134 may, for example, receive messages from the canvas engine 146 indicating that documents have been created or added to the canvas by either the user of the local client 102 or other members of the conversation.

In an example embodiment, the GUI generator 112 may also include a process engine 136. The process engine 136 may generate the processes displayed in the conversation GUI based on selection by a user. The process engine 136 may, for example, cause a process section of the conversation GUI to show a list of tasks which need to be performed as part of the process. The tasks may be required to be performed in a specified order, or in any order. Examples of relationships between tasks and processes are shown and described with respect to FIGS. 8A and 8B. The process engine 136 may also cause the process section to indicate which tasks of the process have been completed. The process engine 136 may also send messages to the message receiver 134 of the feed engine 130 regarding states of processes and/or required steps or tasks.

The process engine 136 may include a process generator 138. The process generator 138 may allow the user of the local client 102, who may also be a member (such as a creator or manager) of the conversation, to generate a process. The process may include multiple tasks to be performed by the members of the conversation. The user may generate the process by selecting a predefined process, which includes predefined tasks, or by defining a process himself or herself, which may include naming the process, deciding on a number of tasks included in the process, and naming each of the tasks. A predefined process may be retrieved from, for example, an Enterprise Resource Planning (ERP) system process configuration.

In an example embodiment, the process generator 138 may include a selector 140. The selector 140 may allow the user to select a predefined process. The selector 140 may receive a selection of a predefined process from the user. The selector 140 may cause the process section of the conversation GUI to display predefined processes, and receive a selection by the user clicking on one of the processes, or may receive a keyboard input associated with a predefined process, according to example implementations. An example of a process selection GUI for selecting or defining a process is shown and described with respect to FIG. 7E.

The user may, for example, select a predefined process such as "Hire a New Employee." The predefined process may have been stored by the server 104. If the user of the local client 102 selects a predefined process, the local client 102 may send a message to the server 104 identifying the predefined process. The server 104 may respond by sending the process, with the associated or included tasks, to the local client 102. The conversation GUI of the local client 102 may respond to receiving the process by displaying the process, including the tasks associated with or included in the process, in the process section.

The process generator 138 may also include a definer 142. The definer 142 may enable a user to define a process. The definer 142 may generate a definition GUI, or a define process interactor of a process selection GUI, which receives a name, number of tasks, and task names from the user. The definition GUI may also receive any associations between the tasks, such as which tasks must be performed before subsequent tasks may begin. The local client 102 may send the name, number of tasks, and task names to the server 104 for storage and propagation to the remote clients 106, 108. The process section of the conversation GUI may display the defined process, including the defined tasks, either upon receipt of the input from the user, or in response to receiving the defined process back from the server 104, according to example implementations. The user may thereby define the tasks which are part of the process.

The GUI generator 112 may also include a poll generator 144. The poll generator 144 may allow a user of the local client 102 to create polls. The user of the local client 102 may generate polls to ask for responses from other members of the conversation, such as the users of the remote clients 106, 108. The polls may request responses from all members of the conversation, or selected members of the conversation. The poll generator 144 may, for example, generate polls which ask questions such as 'yes' or 'no' of the other members of the conversation. The poll generator 144 may process responses received from the other members of the conversation.

In an example embodiment, the poll generator 144 may generate a poll GUI on the local client 102. The poll GUI may receive input from the user, such as a name and/or question of the poll, possible responses ('yes' or 'no' or open-ended answers which allow the respondents to enter text input), and the recipients of the poll (which may include an option for all members of the conversation to receive the poll). In an example embodiment, the process generator 138 may, depending on the definition of the process, change the tasks and/or order of the tasks to be performed based on responses to the poll. The local client 102 may send the poll, including the name and/or question, possible responses, and recipients, to the server 104, and the server 104 may send the poll and/or question to the selected members of the conversation. The selected members may receive messages, which may result in their respective remote clients 106, 108 generating response GUIs, which allow the members to enter their responses. The remote clients 106, 108 may send the responses to the server 104. The server 104 may compile and/or aggregate the responses and send the compiled and/or aggregated responses to the local client 102. The local client 102 may display the responses to the user.

The GUI generator 112 may also include a canvas engine 146. The canvas engine 146 may cause a canvas section of the conversation GUI to display icons representing documents associated with the conversation, and enable the user to interact with the icons and their associated documents. The user may update the conversation by interacting with the icons and their associated documents. For example, the members of the conversation may be working on a word processing document and may make modifications to the word processing document, or the members may be operating on a spreadsheet or presentation document and may make comments or changes to the document. The changes that the members make to the document may be uploaded from their respective client device 102, 106, 108 to the server 104.

The canvas engine 146 may include an uploader 148. The uploader 148 may upload documents, and/or changes to documents, from the local client 102 to the server 104. The server 104 may propagate the uploaded documents, and/or changes to the documents, by sending or downloading the documents or changes to other clients 106, 108.

The canvas engine 146 may also include a downloader 150. The downloader 150 may process documents received from the server 104 and cause the canvas to present icons associated with or representing the documents to the user in the conversation GUI. The downloader 150 may also process changes to the documents that are received from the server, so that when the user opens a document within the conversation GUI, the user will see the most recent version of the document. The downloader 150 may also send messages to the message receiver 134 indicating that documents have been created or added to the canvas by other members, prompting the feed engine 130 to display a message in the feed section indicating that a document has been added to the canvas.

The canvas engine 146 may also include a displayer 152. The displayer 152 may cause icons associated with the documents to be displayed in the canvas of the conversation GUI. The displayer 152 may also cause thumbnail sketches of the documents, such as the first pages of word processing documents, to be displayed in the canvas of the conversation GUI. The displayer 152 may also allow a user to zoom in or out of, or open a document, so that the user can look at the document more closely, and/or make changes or modifications to the document.

The canvas engine 146 may also include an arranger 154. The arranger 154 may receive input from the user, and enable the user to move the icons representing the documents within the canvas. The user may thereby move the icons to desired locations within the canvas in an arrangement that is easily understandable and visually pleasing to the viewer.

The canvas engine 146 may also include a filter engine 156. The filter engine 156 may generate a filter engine which allows a user to filter the documents to see only desired documents (and/or their associated icons), such as documents associated with particular tasks or which were received from particular users, within the canvas. The filter engine 156 may generate the filter GUI within the canvas or elsewhere within the conversation GUI. The filter GUI may receive filter input from the user, such as a selection of a particular task, and filter the documents based on the selected filter. For example, the user may make a selection in the filter GUI to see only documents associated with a specified task. The filter engine 156 may respond to the selection by hiding the icons that do not represent documents associated with the selected task, so that the canvas displays only the icons that represent documents associated with the selected task.

The GUI generator 112 may also include an associator 158. The associator 158 may process input from a user associating people with tasks, documents with tasks, people with messages, tasks with messages or documents with messages. The associator 158 may generate an associator GUI that receives the association input from the user, or the association inputs may be received in the people section, feed section, process section, and/or canvas of the conversation GUI. The associator 158 may also perform filtering within the feed section, process section, and/or document section based on the associations, enabling a user of the local client 102 to select a particular document, particular task, or particular message, and view messages associated with the particular document, messages associated with the particular task, tasks associated with the particular message, or documents associated with the particular message, according to example implementations.

The local client 102 may also include a contacts engine 114. The contacts engine 114 may maintain and/or process contacts of the user of the local client 102. The contacts may include a name of a person, picture or image of the person, and contact information, such as telephone number(s), email address, and/or physical address. The contacts engine 114 may, for example, cause the local client 102 to display the contacts to the user within an application outside the conversation GUI, or within an application that contains or includes the conversation GUI.

The contacts engine 114 may interact with the GUI generator to create a conversation and/or add persons to a conversation. In an example implementation, the user may drag icons associated with contacts from the desktop or other application onto the conversation GUI, thereby adding the persons represented by the contacts to the conversation.

The local client 102 may also include a documents engine 116. The documents engine 116 may store and/or present documents (and/or icons associated with the documents) to the user. The documents engine 116 may also interact with the contacts engine 114 to generate a conversation. In example implementations, a user may drag a contact onto a document to create a conversation which includes that person or contact and the document, or the user may drag a document onto a contact to create a conversation which includes the contact and the document. The documents engine 116 may also interact with the GUI generator 112 to add documents to a conversation, such as by responding to the user dragging a document onto the conversation GUI by associating the dragged document with the conversation.

The local client 102 may also include an operating system 118. The operating system 118 may control access by applications of the local client 102, including the GUI generator 112, to hardware resources of the local client 102. The operating system 118 may also control interaction between applications within the local client 102.

The local client 102 may also include software applications 120. The software applications 120 may include word processing applications, spreadsheet applications, or presentation applications, as non-limiting examples. The user of the local client 102 may use the software applications 120 to view and/or modify documents associated with the conversation.

The local client 102 may also include a processor 122. The processor 122 may include one or more processors or microprocessors capable of executing instructions and performing functions and processes described herein. The local client 102 may also include a memory 124. The memory 124 may store data and/or instructions. The memory 124 may, for example, include one or more devices which store instructions executed by the processor 122 to perform functions and processes such as those functions and processes described herein. The memory 124 may also store contacts and documents associated with the conversation, and may store states of the conversation. In an example implementation, the memory 124 may include a non-transitory computer-readable storage medium comprising instructions stored thereon that, when executed by at least one processor, are configured to cause the local client 102 to implement the GUI generator 112 and conversation GUI.

The local client 102 may also include a display 126. The display 126 may provide output to a user and may, for example, include a screen or display presenting visual information to the user. The local client 102 may also include an input/output device 160. The input/output device 160 may, for example, include one or more communication ports, such as a twisted pair, coaxial cable, optical fiber, or antenna, via which the local client 102 may communicate with the network 110 and/or server 104 and remote clients 106, 108.

Figure 1C:
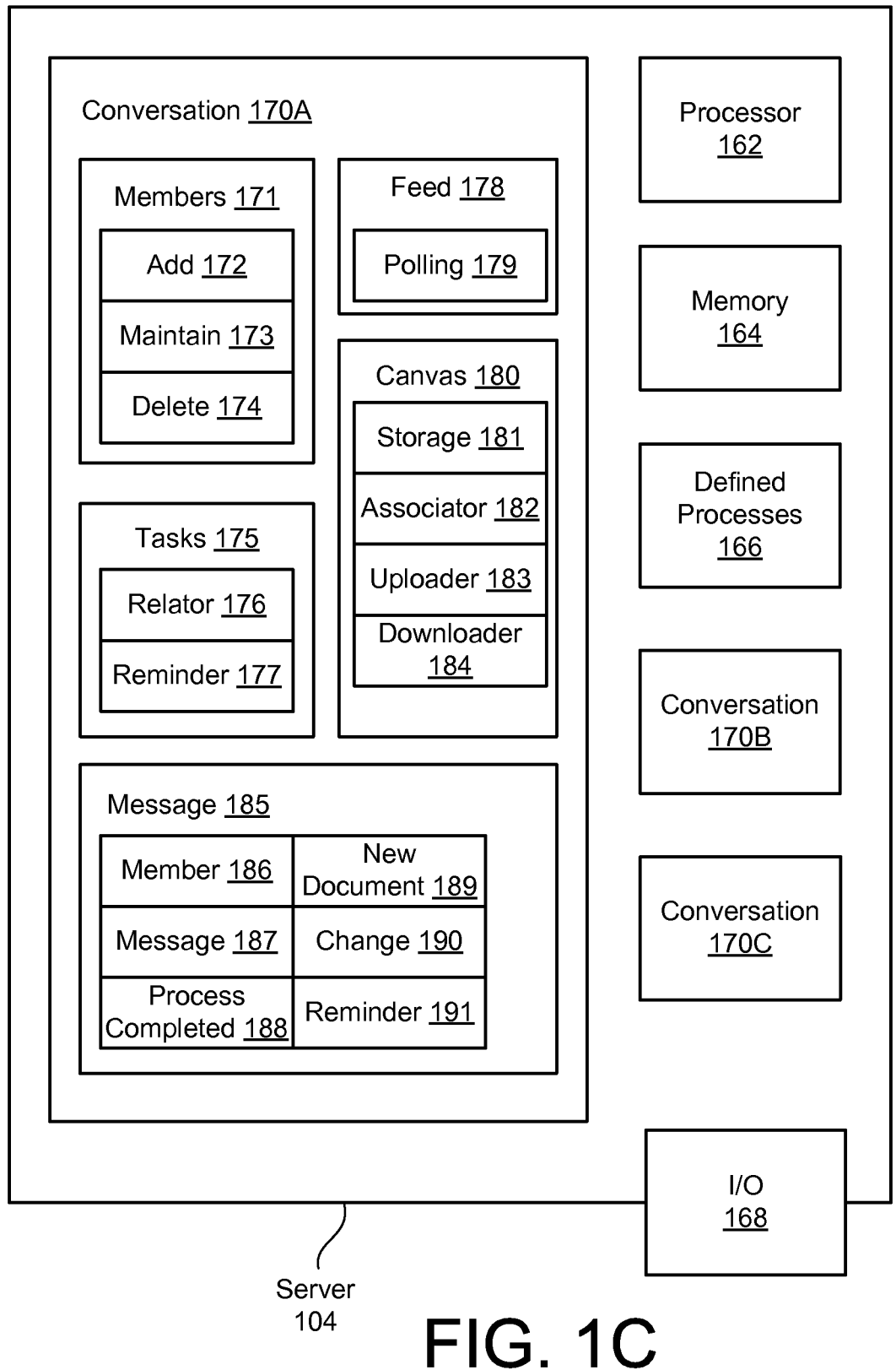
FIG. 1C is a diagram showing the server according to an example implementation.

FIG. 1C is a diagram of the server 104 according to an example embodiment. In this example, the server 104 may include a conversation engine 170A. The server 104 may include multiple conversation engines such as conversation engines 170A, 170B, and 170C representing multiple conversations stored and processed by the server 104. The conversation engines 170A, 170B, 170C may inherit properties of, or be instances of, a conversation class. The conversation engines 170B, 170C may have properties similar to the properties described with respect to the conversation engine 170A. Each conversation engine 170A may store contacts or members, processes and/or tasks, messages, and/or documents associated with its respective conversation. While FIG. 1C shows three conversation engines 170A, 170B, 170C included in the server 104, the server 104 may maintain any number of conversation engines.

The server 104 may include one or more processors 162. The processor 162 may include processors such as microprocessors configured to execute instructions and perform the functions and processes described herein. The server 104 may also include one or more memory devices 164. The memory device(s) 164 may store data such as data associated with multiple conversations represented by the conversation engines 170A, 170B, 170C, and may store instructions executed by the processor 162 to perform the functions and processes described herein. The memory device(s) 164 may, for example, include a non-transitory computer-readable storage medium comprising instructions stored thereon that, when executed by the processor(s) 162, cause the server 104 to implement the conversation engine(s) 170A, 170B, 170C.

The server 104 may also store defined processes 166. The defined processes 166 may be stored in the memory device(s) 164. The defined processes 166 may, for example, include processes for which multiple tasks and their relationships have been defined and which may be requested by the users of the clients 102, 106, 108.

The server 104 may also include an input/output device 168. The input/output device 168 may, for example, include one or more communication ports, such as a twisted pair, coaxial cable, optical fiber, or antenna, via which the server 104 may communicate with the network 110 and/or clients 102, 106, 108.

A conversation engine, such as the conversation engine 170A, may include a members engine 171, a tasks engine 175, a feed engine 178, a canvas engine 180, and a message engine 185. The members engine 171 may process addition, maintenance, and deletion of members of the conversation maintained by the conversation engine 170A. The members engine 171 may, for example, include an add engine 172. The add engine 172 may process the addition of members to the conversation. For example, if a client device 102, 106, 108 sends a message to the server 104 adding a member to a conversation, then the add engine 172 will add the member to the conversation, and may notify the client devices 102, 106, 108 associated with the previous members of the addition to the conversation.

The members engine 171 may also include a maintaining engine 173. The maintaining engine 173 may maintain the members of the conversation. The maintaining engine 173 may, for example, store identifiers associated with each member of the conversation. The conversation engine 170A may check the maintaining engine 173 for the members of the conversation when sending messages to the members of the conversation. The member engine 171 may also include a delete engine 174. The delete engine 174 may allow deletion of members from the conversation based on input from users or members into their respective client device 102, 106, 108. Deletion of members may be restricted to certain members of the conversation. The delete engine 174 may, for example, allow only a manager or creator of the conversation to delete members. If the manager of the conversation deletes a member from the conversation, then the member may be removed from the conversation and/or maintain engine 173, and no longer receive messages or updates of changes to the conversation.

The conversation 170A may also include the tasks engine 175. The tasks engine 175 may store the tasks associated with a particular process generated for the conversation. The tasks engine 175 may store the tasks included in a predefined process stored in the defined processes 166, or tasks defined by a member of the conversation. The tasks engine 175 may store relationships between the tasks and members of the conversation, messages, and/or documents.

The tasks engine 175 may include a relator 176. The relator 176 may relate tasks in the process to other tasks, members of the conversation, documents, or messages, and store the relationships. The tasks engine 174 may also include a reminder engine 177. The reminder engine 177 may remind members of the conversation of tasks that they need to complete. For example, if a member of the conversation has not completed an assigned task within a specified or predetermined time, the reminder engine 177 may create a message to send to the member reminding the member of the task that the member needs to complete. The specified or predetermined time may have been specified by the member who created the process, or specified as part of a predetermined process stored in the defined processes 166.

The conversation 158 may also include a feed engine 178. The feed engine 178 may receive and propagate messages from the different clients 102, 106, 108. The feed engine 178 may, for example, receive messages from one client 102, 106, 108 and send the messages to the other clients 102, 106, 108. The feed engine 178 may include a polling engine 179. The polling engine 179 may, for example, receive a poll request from one of the clients 102, 106, 108. The polling engine 179 may receive a question or title of the poll, options for answering the poll, and recipients of the poll, any or all of which may be included in the poll request. In response to receiving the poll request, the polling engine 179 may send the poll to the members to whom the poll was requested to be sent. Upon receiving responses to the poll, the polling engine 179 may compile or aggregate the responses, and send the responses to the member who generated or requested the poll.

The conversation engine 170A may also include a canvas engine 180. The canvas engine 180 may store and process documents associated with the conversation. The canvas engine 180 may, for example, include a storage engine 181. The storage engine 181 may store documents that have been associated with the conversation and uploaded to the server 104. The canvas engine 180 may also include an associator 182. The associator 182 may associate documents with messages, tasks, or members of the conversation, based on association or relation requests or messages received from the clients 102, 106, 108, or based on defined relationships within a process. The canvas engine 180 may also include an uploader 183. The uploader 183 may receive and process documents uploaded by the clients 102, 106, 108 to the server 104. The canvas engine 180 may also include a downloader 184. The downloader 184 may send uploaded documents, or modifications to documents, to the remaining clients 102, 106, 108.

The conversation engine 170A may include a message engine 185. The message engine 185 may receive, store, and propagate messages generated and received from members associated with the clients 102, 106, 108. The message engine 185 may include a member engine 186. The member engine 186 may notify new members that they have been added to the conversation. The member engine 186 may also notify present members that a new member has been added to the conversation.

The message engine 185 may also include a message feed engine 187. The message feed engine 187 may receive messages posted by members of the conversation to the feed section, and propagate or send the messages to the remaining members of the conversation for display in the feed sections of their respective conversation GUIs.

The message engine 185 may also include a process completed engine 188. The process completed engine 188 may send messages to the members and associated clients 102, 106, 108 indicating that processes or tasks have been completed. The process completed engine 188 may send messages indicating that tasks have been completed to all of the members of the conversation and their associated clients 102, 106, 108, to the member associated with or assigned to a task and his or her associated client 102, 106, 108, or to the member who generated the process or conversation and his or her associated client 102, 106, 108.

The message engine 185 may also include a new document engine 189. The new document engine 189 may generate and send messages to members and their associated clients 102, 106, 108 when documents are added to the conversation.

The message engine 185 may also include a change engine 190. The change engine 190 may send messages to members and their associated clients 102, 106, 108 informing the members that documents have been changed, prompting the members to look at the changes to the document.

The message engine 185 may also include a reminder engine 191. The reminder engine 191 may send messages to members and their respective clients 102, 106, 108, reminding the members that they need to complete a task.

Figure 2:
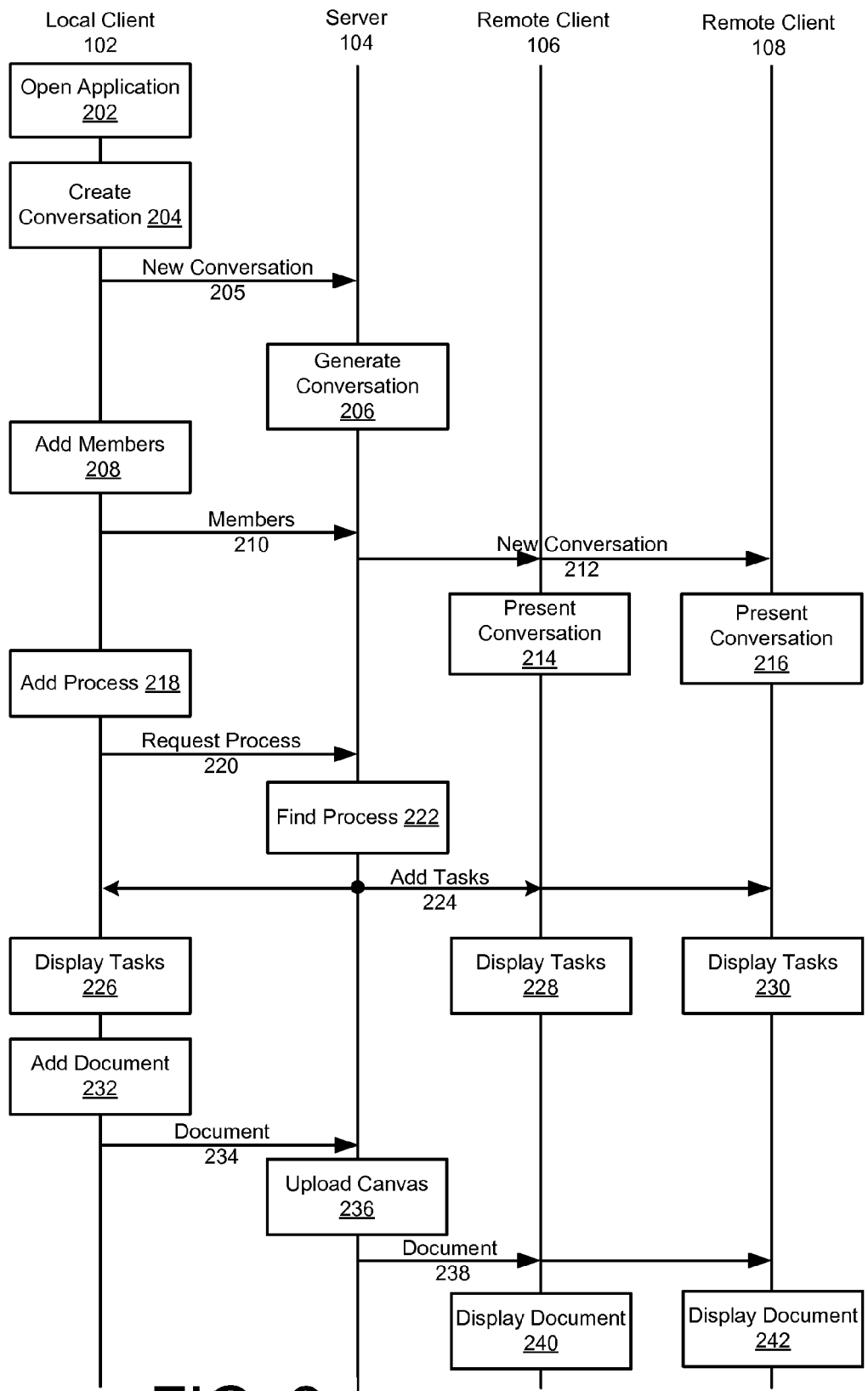
FIG. 2 is a timing diagram showing creation of a conversation, and related communication between the clients and the server, according to an example implementation.

FIG. 2 is a timing diagram showing creation of a conversation, and related communication between the clients 102, 106, 108 and the server 104, according to an example implementation. In this example, the user of the local client 102 may open the conversation graphical user interface (GUI) application (202). The user of the local client 102 may, for example, open the conversation GUI application on his desktop, laptop or notebook, tablet, or other computing device. The user of the local client 102 may create a conversation (204). The user of the local client 102 may create the conversation by clicking an icon or selecting a field to create a conversation within the conversation GUI, or by performing another task such as dragging the contact icon onto a document icon or dragging a document icon onto a contact icon. Based on the user of the local client 102 creating the conversation (204), the local client may send a new conversation message 205 to the server 104. The new conversation message 205 may indicate the members of the conversation and any documents associated with the conversation. The new conversation message 205 may also include the document(s) associated with the conversation. In response to receiving the new conversation message 205, the server 104 may generate the new conversation within the server 104 (206). The server 104 may generate the conversation by creating a new conversation within the server 104, which may indicate the persons and documents associated with the conversation, and by storing the indicated document(s) within the server 104.

After creating the conversation, the user of the local client 102 may add people or members to the conversation (208). The user of the local client 102 may add people or members to the conversation by dragging icons associated with people or contacts from a contacts folder onto the conversation GUI, or by selecting contacts from within the conversation GUI. In response to the user of the local client 102 adding people or members to the conversation, the local client 102 may send a members message 210 to the server 104. The members message 210 may indicate the people or members to be added to the conversation. The server 104 may add the new members to the conversation by associating the members or contacts, who were indicated by the members message 210, with the conversation, and may send a new conversation message 212 to the remote clients 106, 108 associated with the contacts or members of the conversation. The remote clients 106, 108 may, in response to receiving the new conversation message 212, which may indicate the members and include any documents associated with the conversation, present the conversation GUI (214, 216) on their respective displays. The remote clients 106, 108 may also present and/or generate messages, such as emails, to their respective users informing the respective users that the conversation has been created.

The user of the local client 102 may also add a process to the conversation (218). The user of the local client 102 may add a process to the conversation by selecting a predefined process, which may include predefined tasks, or may define a process by defining tasks for the process. In response to the user adding a process to the conversation (218), the local client 102 may send a request process message 220 to the server 104. If the process is a predetermined process, then the server 104 may find the process within the defined processes 166 (222). The server 104 may find the process within its memory 164 and/or defined processes 166, and populate the process with the predefined tasks. After populating the process with the predefined tasks, the server 104 may send an add task message 224 to the local client 102 and remote clients 106, 108. After the local client 102 and remote clients 106, 108 have received the tasks, the local client 102 and remote clients 106, 108 may display the tasks on their respective conversation GUIs (226, 228, 230).

During the conversation, the user of the local client 102 may add a document to the conversation (232). The user may add a document to the conversation (232) by dragging an icon associated with the document onto the conversation GUI, or by selecting the document from within the conversation GUI. In response to the user adding the document, the local client 102 may upload or send the document 234 to the server 104. The server 104 may update the canvas by receiving, storing and associating the document with the conversation. The server 104 may send the document 238 to the remote clients 106, 108. The remote clients 106, 108 may display the document (240, 242) on their respective canvases of their respective conversation GUIs, and may notify the respective users that the document is part of the conversation.

Figure 3:
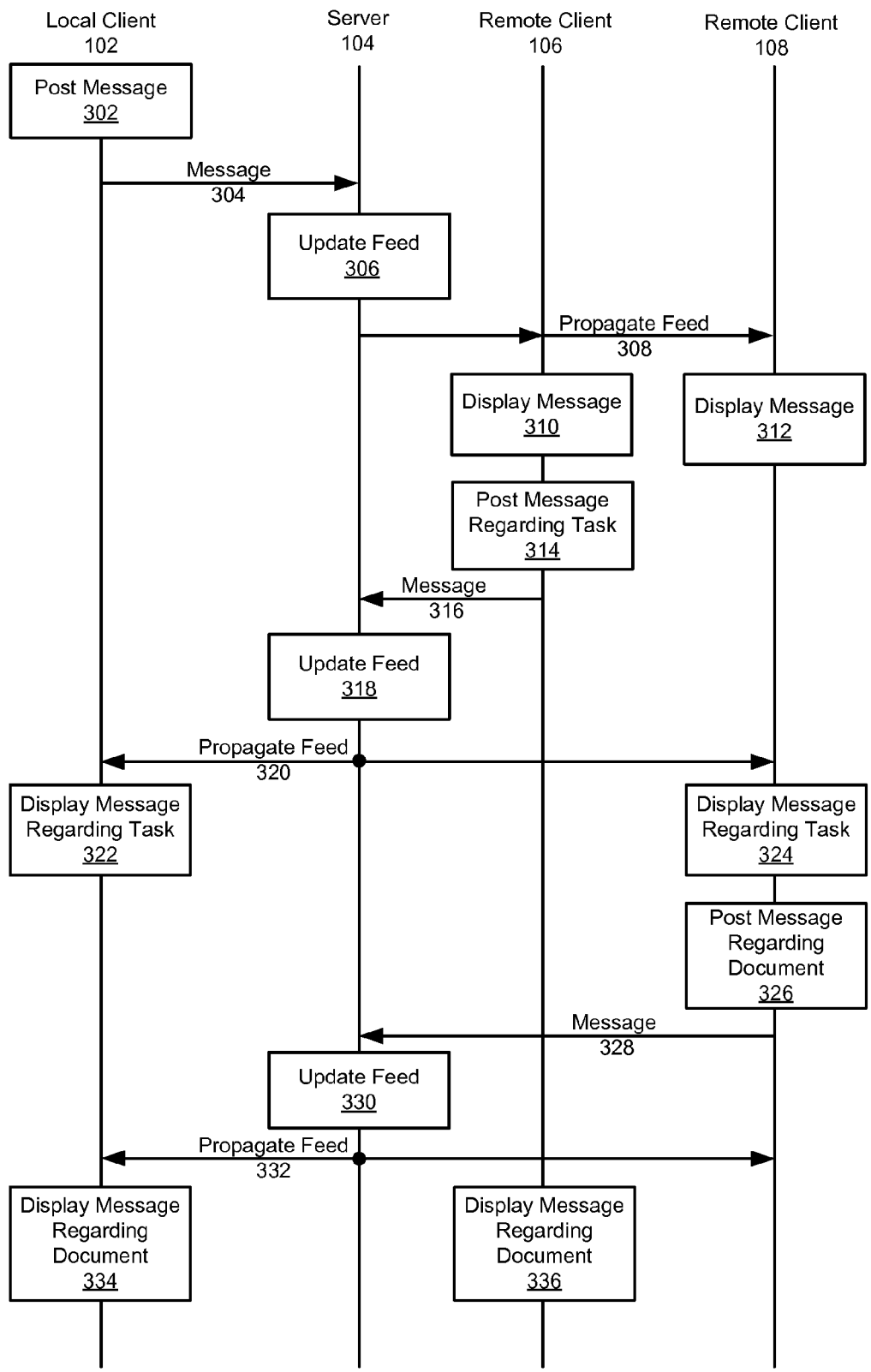
FIG. 3 is a timing diagram showing posting of messages, and related communication between the clients and the server, according to an example implementation.

FIG. 3 is a timing diagram showing posting of messages, and related communication between the clients 102, 106, 108 and the server 104, according to an example implementation. In this example, the user of the local client 102 may post a message (302). The user may post the message (302) by, for example, typing the message into the feed section of the conversation GUI of the local client 102. The local client 102 may respond to the user posting the message (302) by sending the message 304 to the server 104. The server 104 may respond to receiving the message 304 by updating the feed (306). The server 104 may update the feed by storing and associating the message with the conversation. The server 104 may propagate the feed 308 by sending the message to the remote clients 106, 108. The remote clients 106, 108 may respond to receiving the feed or message 308 by displaying the message on their respective GUIs (310, 312).

Another user associated with the remote client 106 may post a message regarding or associated with a task (314). The user may, for example, associate the message with the task by clicking on the task within the process section of his or her respective conversation GUI and typing the message. In response to the user of the remote client 106 posting the message regarding or associated with the task (314), the remote client 106 may send the message 316 to the server 104. The message 316 may include the message and indicate the task with which the message is associated. The server 104 may respond to receiving the message 316 by updating the feed (318). The server 104 may update the feed (318) by adding the message to the feed and associating the message with the task. The server 104 may propagate the feed 320 by sending the message to the clients 102, 108. The propagation of the feed may include the message and identify the task associated with the message. The clients 102, 108 may respond to receiving the feed by displaying the message in association with the task on their respective conversation GUIs (322, 324).

A user associated with the remote client 108 may post a message associated with or regarding a document (326). The user may associate the message with the document by clicking on the document within the canvas section or his or her respective conversation GUI and typing the message. In response to the user of the remote client 108 posting the message associated with or regarding the document (326), the remote client 108 may send a message 328 to the server 104. The message 328 may include the message and the association of the message with the document. In response to receiving the message 328, the server 104 may update the feed (330). The server 104 may update the feed by adding the message to the feed and storing the association of the message with the document. The server 104 may also propagate the feed 332. The server 104 may propagate the feed by sending the message, and the association of the message with the document, to the clients 102, 106. In response to receiving the message, the clients 102, 106 may display the message and the message association with the document in the feed sections of their respective conversation GUIs (334, 336).

Figure 4:
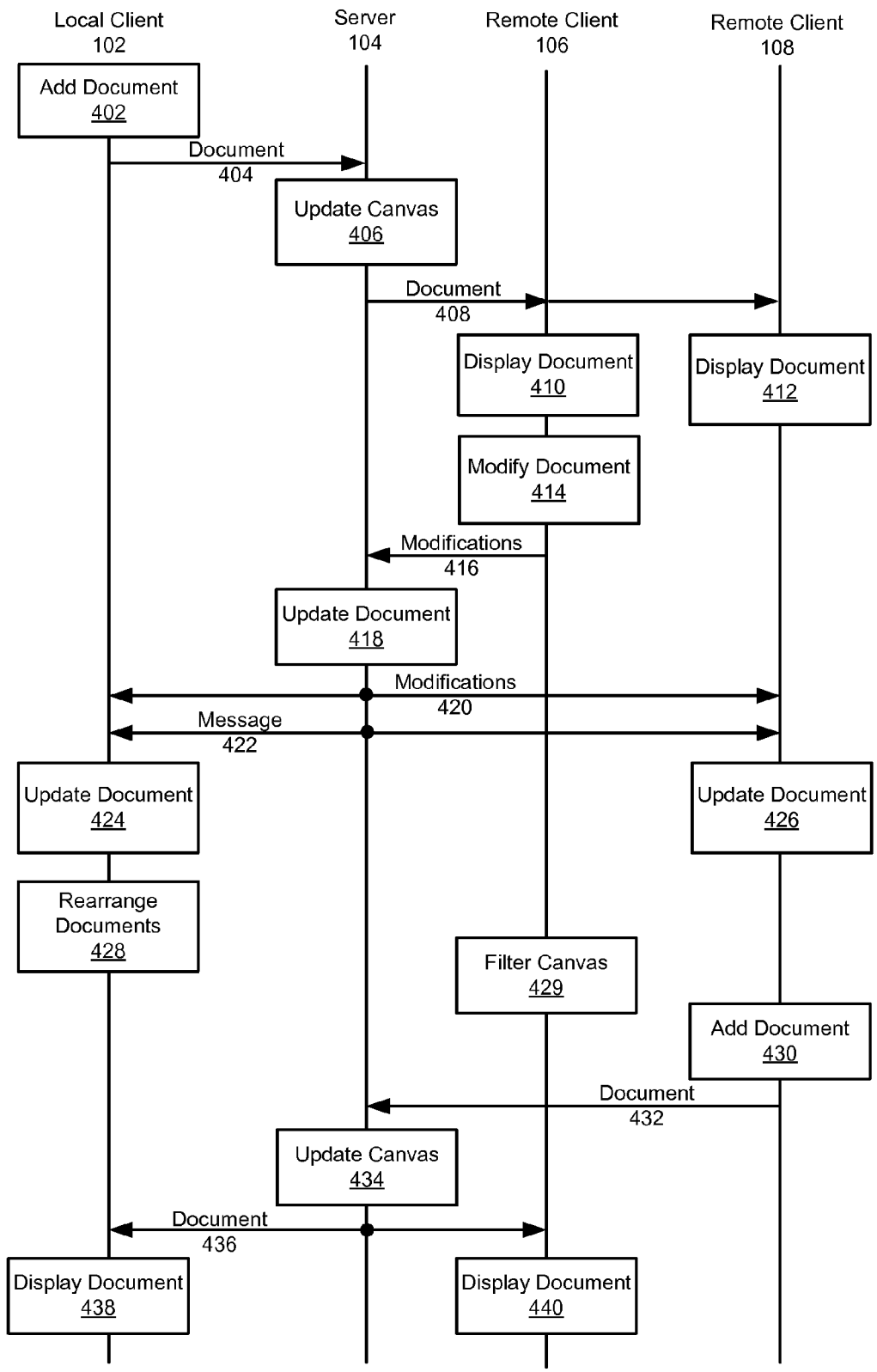
FIG. 4 is a timing diagram showing processes performed with respect to a document, and related communication between the clients and the server, according to an example implementation.

FIG. 4 is a timing diagram showing processes performed with respect to a document, and related communication between the clients 102, 106, 108 and the server 104, according to an example implementation. A user of the local client 102 may add a document to the conversation (402). The user may add the document to the conversation (402) by dragging an icon associated with the document onto the canvas of the conversation GUI, or by selecting the document from within the conversation GUI, such as by opening a browser within the conversation GUI. In response to the user adding the document to the conversation (402), the client 102 may upload the document 404 to the server 104. The server 104 may respond to receiving the document 404 by updating the canvas (406). The server 104 may update the canvas by storing the document and associating the document with the conversation. The server 104 may also send the document 408 to the remote clients 106, 108. The remote clients 106, 108 may respond to receiving the document 408 by displaying the document in their canvases of their respective conversation GUIs (410, 412).

A user of the remote client 106 may modify the document (414). The user of the remote client 106 may modify the document (414) by, for example, opening the document and making modifications or revisions to the document. When the user of the remote client 106 saves changes to the document, the remote client 106 may send modifications 416 of the document to the server 104. The modifications 416 may include only changes to the document, or the final version of the document. The server 104 may update the document (418). The server 104 may update the document (418) by storing changes to the document, or by storing the most recent version of the document. The server 104 may respond to receiving the modifications by sending the modifications 420 to the local client 102 and the remote client 108. The modifications 420 may include only changes to the document, or the final most recent versions of the document. The server 104 may also send modification messages 422 to the local client 102 and the remote client 108. The modification messages 422 may simply state that changes have been made to the document, or may identify the changes that were made to the document. The modifications 420 to the document may allow the local client 102 and remote client 108 to update the document locally (424, 426). The clients 102, 108 may update the documents so that their respective users can see and work within the most recent versions.

A user, such as the user of the local client 102, may choose to rearrange the documents within the canvas of his or her respective conversation GUI (428). The user may, for example, drag icons associated with the document to different places within the canvas, changing the appearance of the documents within the canvas. The display of the local client 102 may show the changed version of the canvas with the rearranged documents. These changes may be made only to the user's respective canvas and conversation GUI; no message may need to be sent to the server 104, and no changes may need to be made to the other clients 106, 108.

A user, such as the user of the remote client 106, may choose to filter the canvas of his or her respective conversation GUI (429). The user may, for example, choose to filter the canvas to show only documents associated with a particular task, a particular message, or a particular user. The user may filter the canvas by selecting a filter option within the canvas or within a filter section of the conversation GUI, according to example implementations. The canvas of the conversation GUI displayed by the remote client 106 may respond to the filtering by showing icons of only those documents which meet the filter criteria. The filtering may be performed only on the user's respective canvas and conversation GUI; no message may need to be sent to the server 104, and no changes may need to be made to the other clients 106, 108.

A user, such as the user of the remote client 108, may also choose to add a document to the conversation (430). The user may, for example, decide that a new document would add value to the conversation. The user may add the document by dragging the document onto the canvas of his or her respective conversation GUI, or by selecting the document from within the conversation GUI. When the user adds the document to the conversation, the remote client 108 may respond by uploading the document 432 to the server 104. The server 104 may respond to receiving the document 432 by updating the canvas (434). The server 104 may, for example, store the document and associate the document with the conversation. The server 104 may also download the document 436 to the clients 102, 106. In response to receiving the document 436, the clients 102, 106 may display the document, or an icon representing the document, within the canvases of their respective conversation GUIs (438, 440).

Figure 5:
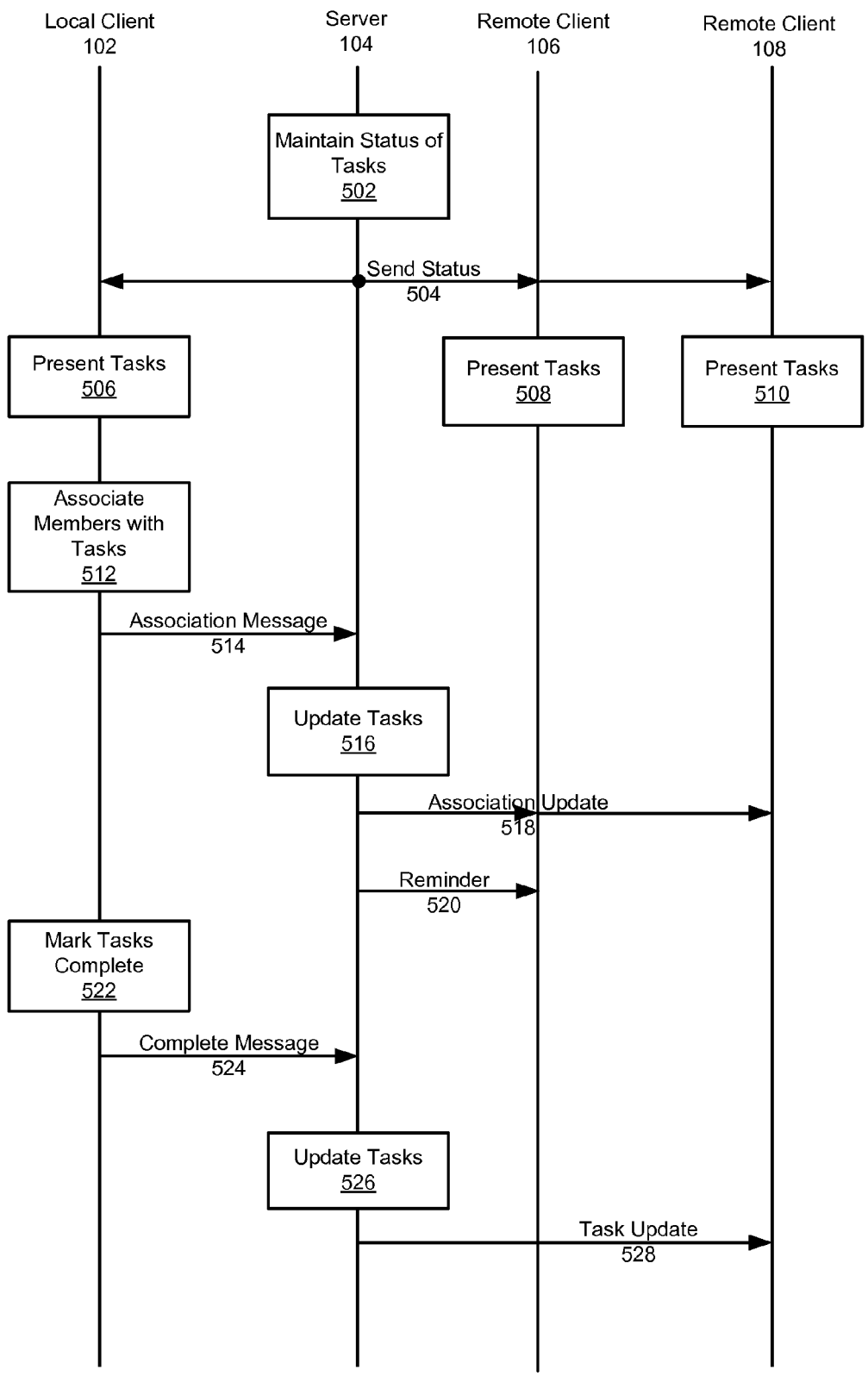
FIG. 5 is a timing diagram showing processes performed with respect to a process and tasks included therein, and related communication between the clients and the server, according to an example implementation.

FIG. 5 is a timing diagram showing processes performed with respect to a process and tasks included therein, and related communication between the clients 102, 106, 108 and the server 104, according to an example implementation. The server 104 may maintain a plurality of predefined or user created processes. Each process may include one or more tasks. The server 104 may maintain the status of tasks (502) associated with a process. The server 104 may, for example, store a list of tasks associated with the process, a description of each task, relationships between the tasks, associations of the tasks with members of the conversation, a description of the organizational role of the users or members that should be assigned to the tasks, a description of what actions each member should take, where the tasks is located within the corresponding process, the progress of the tasks, and whether the tasks have been completed. The server 104 may send the status of the tasks 504 to the clients 102, 106, 108. The server 104 may send the status of the tasks 504 by sending the list of the tasks to the clients 102, 106, 108, and the respective statuses of the tasks. The clients 102, 106, 108 may, in response to receiving the tasks and/or statuses of the tasks 504, present the tasks to their respective users within the process sections of their conversation GUIs (506, 508, 510).

A user, such as the user of the local client 102, may associate people or members of the conversation with tasks (512). The user may, for example, associate people or members with tasks so that particular members will be assigned to perform particular tasks. Each person or member may be assigned to one or more of the tasks of a process. Each task of a process may be associated with a different set of people or members. The user may associate members with tasks by dragging their contact icons onto the tasks, or by clicking on the tasks and selecting the member(s) to associate with the task. In response to the user associating people and members with tasks (512), the local client 102 may send an association message 514 to the server 104. The association message 514 may indicate which people or members are associated with each task. The server 104 may respond to receiving the association message 514 by updating the task (516). The server 104 may update the task (516) by, for example, storing the associations between members or people and their associated tasks. The server 104 may also send an association update 518 to the remote clients 106, 108. The association update 518 may indicate which tasks the members are associated with or assigned to. The association update 518 may be sent only to the persons who are assigned particular tasks, or may be sent to all members of the conversation so that all members will know who is assigned to what tasks.

In an example embodiment, the conversation GUI of a client 102, 106, 108 may change an appearance of messages based on the user's selection of a task. For example, if the user selects a task, such as by clicking on the task, the conversation GUI may show only messages associated with the selected task, hiding messages that are not associated with the selected task. The user may thereby view discussions or messages about the selected task.

The server 104 may also maintain a calendar or timer to track whether members complete their assigned tasks in time. If a member has not completed his or her task within a particular time, the server 104 may, for example, send a reminder 520 to a client 106 associated with the assigned member. The reminder 520 may include a message informing the user of the client 106 that the user has not completed the task within a predetermined time.

Each task of process may have a set of progress indicators or statuses. The progress indicators or statuses may include not yet started, in progress, and completed. A user, such as the user of the local client 102, may update the status of a task. For example, a user may change the status of a task from in progress to completed.

Figure 6:
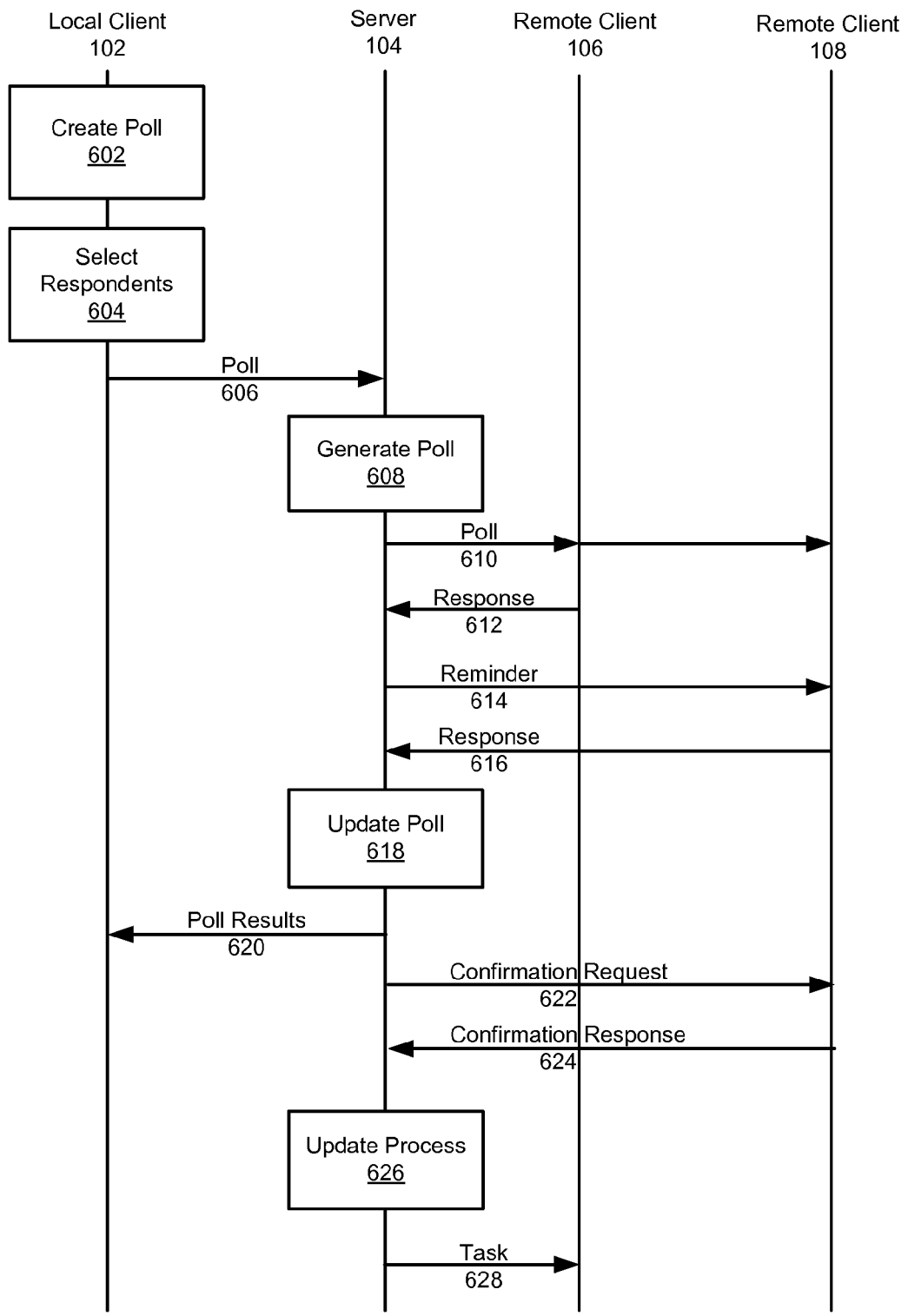
FIG. 6 is a timing diagram showing polling of members, and related communication between the clients and the server, according to an example implementation.

A user, such as the user of the local client 102, may mark a task as complete (522). The user may mark the task as complete (522) by, for example, clicking on the task and selecting a 'complete' option. The user may, for example, determine that a task has been completed and that the next task should be performed. In response to the user marking the task as complete, the local client 102 may send a complete message 524 to the server 104. The complete message 524 may indicate that the task has been completed, and may or may not associate a member with the task. The server 104 may update the task (526). The server 104 may update the task (526) by, for example, storing an indication that the task has been completed. The server 104 may send a task update message 528 to one or more members of the conversation. The task update message 528 may describe the task that was completed, the one or more users that completed the task, the overall progress of the process corresponding to the task, the next action or task to perform, and the users that should perform the next tasks. The task update message 528 may include a link to the graphical user interface that display information about the process and the tasks. FIG. 6 is a timing diagram showing polling of members, and related communication between the clients 102, 106, 108 and the server 104, according to an example implementation. In this example, a user, such as the user of the local client 102, may create a poll (602). The user may, for example, request input of votes on a particular question. The poll may be directed to all of the members of the conversation or only specified members. The user may, for example, select respondents for the poll (604). In response to the user creating the poll, the local client 102 may send the poll 606 to the server 104. The poll 606 may include the title or question of the poll, the allowable responses or options for the poll, and the intended recipients of the poll.

In response to receiving the poll 606, the server 104 may generate the poll (608). The server 104 may generate the poll by storing a question or message associated with the poll, possible responses selected by the user who created the poll, and members of the conversation to whom the poll should be sent. The server 104 may also the send the polling question 610 to the members of the conversation. The server 104 may, for example, send the poll question 610 to the clients 106, 108. Users may send responses to the poll, and the server 104 may aggregate the responses. For example, the user of the remote client 106 may send his or her response 612 which may be stored by the server 104.

The server 104 may also send reminders 614 to users who do not complete or send their responses within a predetermined time. For example, a predetermined time may pass within which a user of the remote client 108 has not responded to the poll. Based on the predetermined time period expiring, the server 104 may send a reminder message 614 to the remote client 108. The reminder message 614 may remind the user that he or she has not responded to the poll, and may also include the poll with the opportunity to respond. The server 104 may receive the response 616 from the remote client 108. The server 104 may respond to receiving the responses 612, 616 by updating the poll (618). The server 104 may update the poll by storing the responses by the members.

The server may aggregate or compile the responses 612, 616. The server 104 may send the poll result 620 to the local client 102 associated with the user or member who generated the poll. The poll results 620 may aggregate the response to the questions and may, for example, show the number of responses to each question, and may or may not identify who responded in what way to each question.

The server 104 may also request members to confirm whether they have completed assigned tasks. The server 104 may request the members to confirm whether they have completed the assigned tasks based on the process definition, and/or based on the assignments of the tasks to the members. The server 104 may, for example, update which tasks have been performed, and/or which tasks need to be performed, based on the members' responses to the confirmation requests. The members' responses may control the flow or order of tasks within a process based on the relationships between the tasks.

In the example shown in FIG. 6, the server 104 may send the user or member associated with the remote client 108 a confirmation request 622. The confirmation request 622 may inquire whether the member has completed an assigned task within the process. If the user does not respond, then the server 104 may treat the task as incomplete.

The member may respond to the confirmation request 622 by entering an answer into the remote client 108. The remote client 108 may send a confirmation response 624 to the server 104. The confirmation response 624 may indicate whether the member has completed the assigned task. If the confirmation response 624 indicates that the member has not completed the task, then the server 104 may treat the task as incomplete, and may or may not send a message to the local client 102 or manager or creator of the conversation indicating that the task has not yet been completed, depending on the process definition.

If the confirmation response 624 indicates that the member has completed the task, then the server 104 may update the process (626) to indicate that the task is complete. Depending on the process definition, the server 104 may or may not send a message to the local client 102 or manager or creator of the conversation indicating that the task has been completed. Also depending on the definition of the process, the server 104 may determine that a subsequent task needs to be performed based on the completion of the task indicated by the confirmation response 624. If the server 104 determines that a subsequent task needs to be performed, then the server 104 may send a message, such as a task message 628, to another remote client 106 and/or user or member associated with the remote client 106 informing the member that he or she has been assigned or needs to complete a new task, according to an example implementation.

Figure 7A:
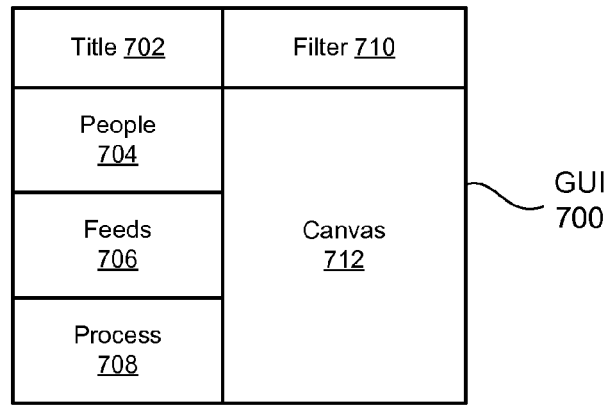
FIG. 7A is a diagram showing a conversation graphical user interface (GUI) according to an example implementation.

FIG. 7A is a diagram showing a conversation graphical user interface (GUI) 700 according to an example implementation. The conversation GUI 700 may be generated by the GUI generator 112 described with respect to FIG. 1B. The spatial relationships between the sections within the conversation GUI 700 may be fixed in the positions shown in FIG. 7A, according to an example implementation. For example, any or all of the title section 702, people section 704, feeds section 706, process section 708, filter 710, and/or canvas 712 may be located in fixed sections of the conversation GUI 700. While all of the sections, namely the title section 702, people section 704, feeds section 706, process section 708, filter 710, and canvas 712 are shown in FIG. 7A, in some examples, fewer than all of the sections may be displayed in the conversation GUI 700. For example, the feeds section 706 may be displayed only after a message has been posted, the process section 708 may be displayed only after a process has been selected or generated, and/or the canvas 712 and filter section 710 may be displayed only after documents have been added to the conversation.

The fixed locations of the title section 702, people section 704, feeds section 706, process section 708, filter 710, and/or canvas 712 may allow a user to peruse or scroll through one section without impacting the other sections. For example, with the canvas 712 separate from the feeds section 706, the user may look at messages in the feeds section 706 without changing the arrangement of documents, or icons representing the documents, in the canvas 712. The user may look at different messages in the feeds section 706, with the documents or representative icons remaining in place in the canvas 712. The user may thereby peruse through the messages in the feeds section 706 (or items in any other section) and open a document in the canvas 712 if desired.

In the example shown in FIG. 7A, the conversation GUI 700 may include a title section 702. The title section 702 may include a title of the conversation associated with the conversation GUI 700. A user may type a title directly into the title section 702. Or, the title may be selected upon creation of the conversation. Changes to the title may be limited to the member who created the conversation, or any users authorized by the member who created of the conversation.

The conversation GUI 700 may also include a people section 704. The people section 704 may be generated by the people engine 128 described with respect to FIG. 1B. The people section 704 may display the people, members or contacts included in the conversation. The people section 704 may, for example, display icons representing each member of the conversation. A user of the conversation GUI 700 may add people to the conversation by dragging and dropping contact icons onto the people section 704, according to an example implementation.

The conversation GUI 700 may also include a feeds section 706. The feed section 706 may be generated by the feed engine 130 described with respect to FIG. 1B. The feeds section 706 may display the messages included in the conversation. The messages may be displayed chronologically, or may be displayed hierarchically in association with tasks. In an example in which the feeds section cannot display all of the messages, because there are too many messages for the feeds section to display, the user may be able to scroll through the messages, changing which messages are displayed in the feeds section.

The conversation GUI 700 may also include a process section 708. The process section 708 may be generated by the process engine 136 described with respect to FIG. 1B. The process section 708 may display tasks associated with the process(s) of the conversation. The process section 708 may also display the status of tasks associated with the conversation. The process section 708 may, for example, indicate whether tasks in the process have been completed. The process section 708 may also display which member is assigned to which task. The process section 708 may also display relationships between tasks, such as which tasks must be completed before other tasks. The process section 708 may, for example, display or indicate relationships between tasks such as the relationships shown and described with respect to FIGS. 8A and 8B.

The conversation GUI 700 may also include a filter section 710. The filter section 710 may allow a user to filter documents displayed within a canvas 712. The filter section 710 may, for example, allow the user to select filters based on members or processes associated with the documents.

The canvas section 712 may display icons associated with documents which are associated with the conversation. The canvas section 712 may be generated by the canvas engine 146 described with respect to FIG. 1B. The canvas section 712 may also include thumbnails of the documents. The canvas section 712 may, for example, allow a user to zoom in on the canvas and/or on documents associated with the conversation. The canvas section 712 may display the documents or their associated icons in the arrangement selected by the user, and may display the documents and their associated icons in accordance with a user's selection(s) in the filter section 710.

Figure 7B:
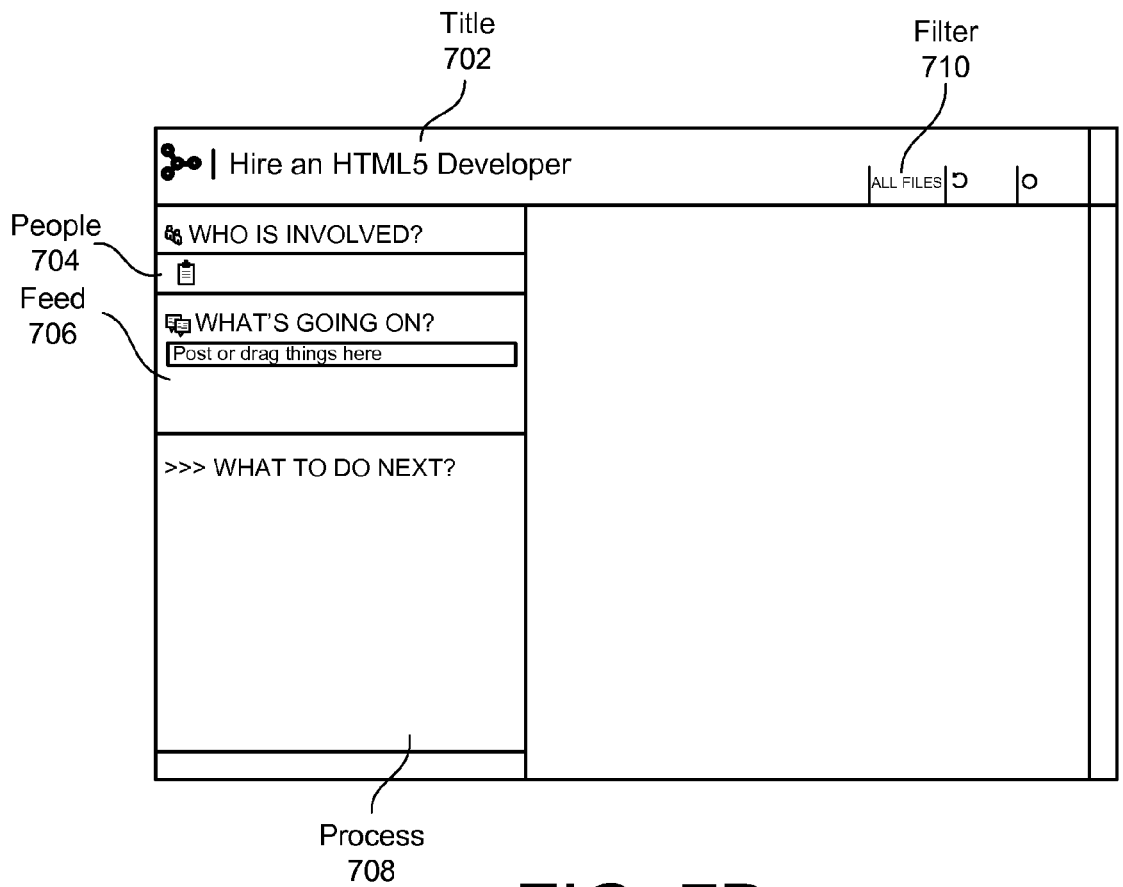
FIG. 7B is a diagram showing the conversation GUI created by a manager of the conversation GUI according to another example implementation.

FIG. 7B is a diagram showing the conversation GUI 700 according to another example implementation. In this example, the conversation has been created (204 shown in FIG. 2), but the creator or manager of the conversation has not yet added any members (208 shown in FIG. 2). Because the creator or manager has not yet added members to the conversation, only one icon, representing the creator or manager, is included in the people section 704. In this example, the title of the conversation is "Hire an HTML5 Developer." Because the creator or manager has not yet added a process to the conversation (218 shown in FIG. 2), no process or tasks are included in the process section 708. Because no messages have been posted (302 shown in FIG. 3), no messages are shown in the feed section 706. Because no documents have been added (232 shown in FIG. 2 or 402 shown in FIG. 4), no documents are shown in the canvas 712.

Figure 7C:
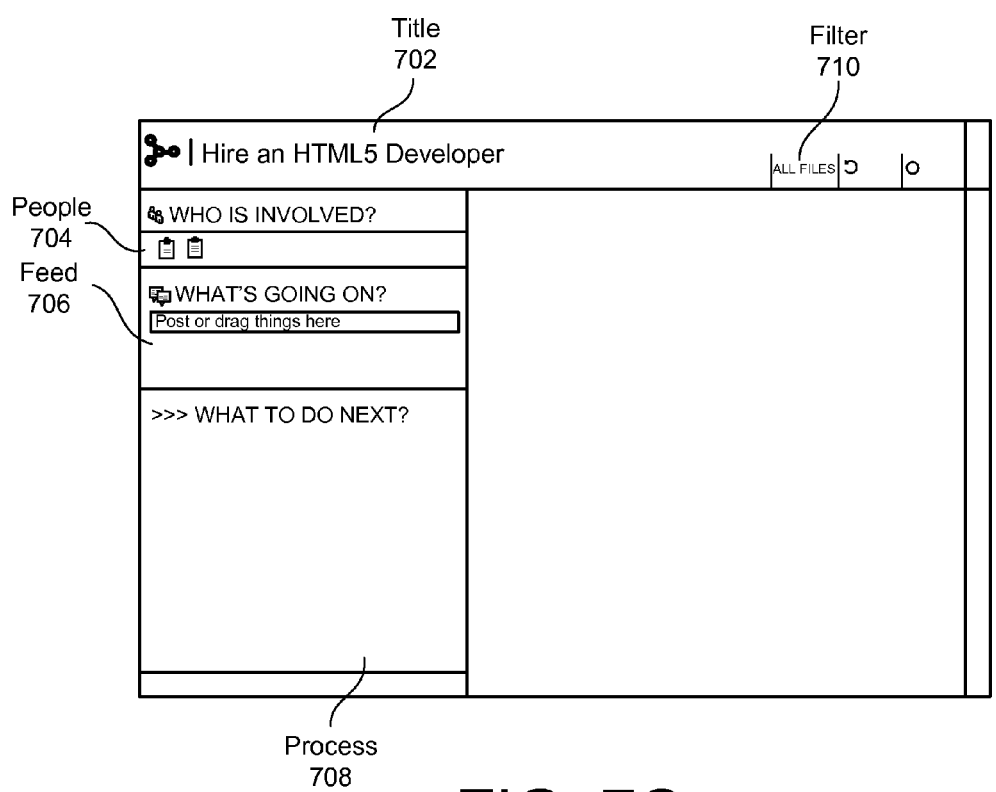
FIG. 7C is a diagram showing the conversation GUI after a second member has been added to the conversation according to an example implementation.

FIG. 7C is a diagram showing the conversation GUI 700 after a second member has been added to the conversation according to an example implementation. In this example, the creator or manager of the conversation has added a second member (208 shown in FIG. 2). Because the creator or manager has added a second member, the people section 704 shows two icons with pictures of the two members of the conversation. The first icon represents the creator or manager, and the second icon represents the member added by the creator or manager.

Figure 7D:
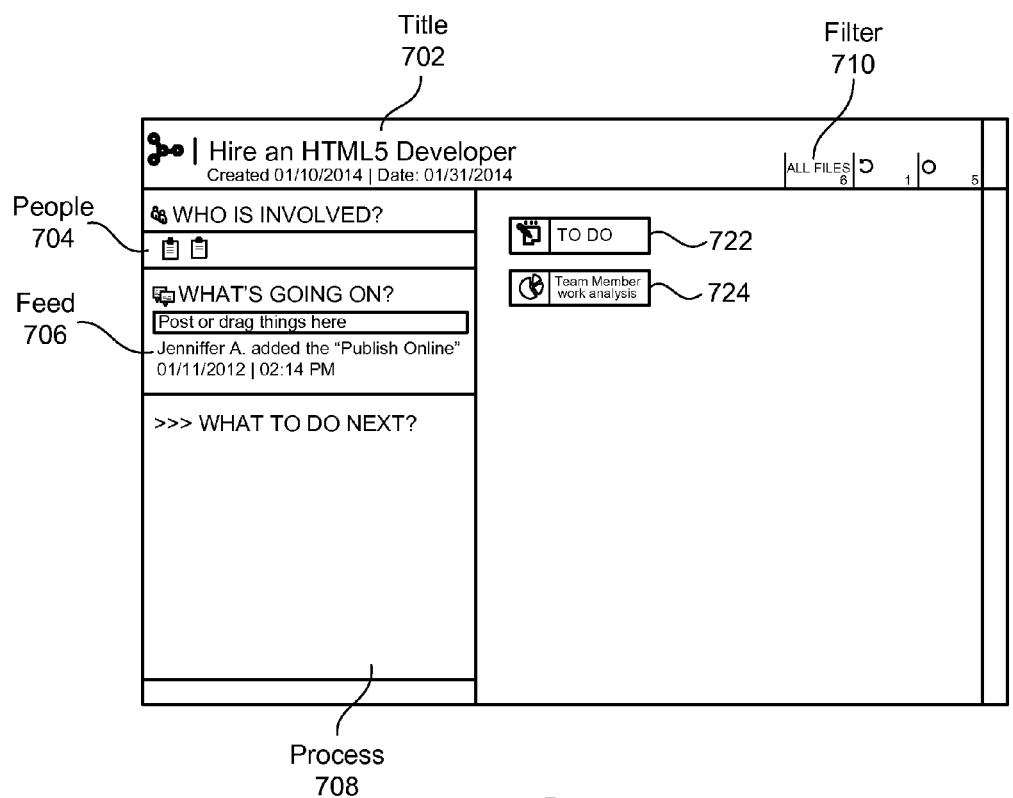
FIG. 7D is a diagram showing the conversation GUI with messages posted in a feed section and two documents posted to a canvas according to an example implementation.

FIG. 7D is a diagram showing the conversation GUI 700 with a message posted in the feed section 706 and two documents posted to the canvas 712 according to an example implementation. In this example, either the creator or manager or the second member have posted a message (302 and 314 shown in FIG. 3) to the conversation. Based the member posting a message to the conversation, the feed section 706 shows a single message regarding hiring an HTML5 developer. Based on either or both of the members uploading documents (232 in FIGS. 2 and 402, 430 in FIG. 4), the canvas 712 shows icons representing two documents, a word processing document called "To Do" 722 and a presentation document called "Team Member Work Analysis" 724.

As discussed above, the conversation may be associated with, or include a process, which includes multiple tasks. The creator or manager of the conversation may select a predefined process, which includes predefined tasks, or may define a process and associated tasks himself or herself. The creator or manager may select the predefined process or define the process by a text-based interface, or by a GUI, according to example implementations.

Figure 7E:
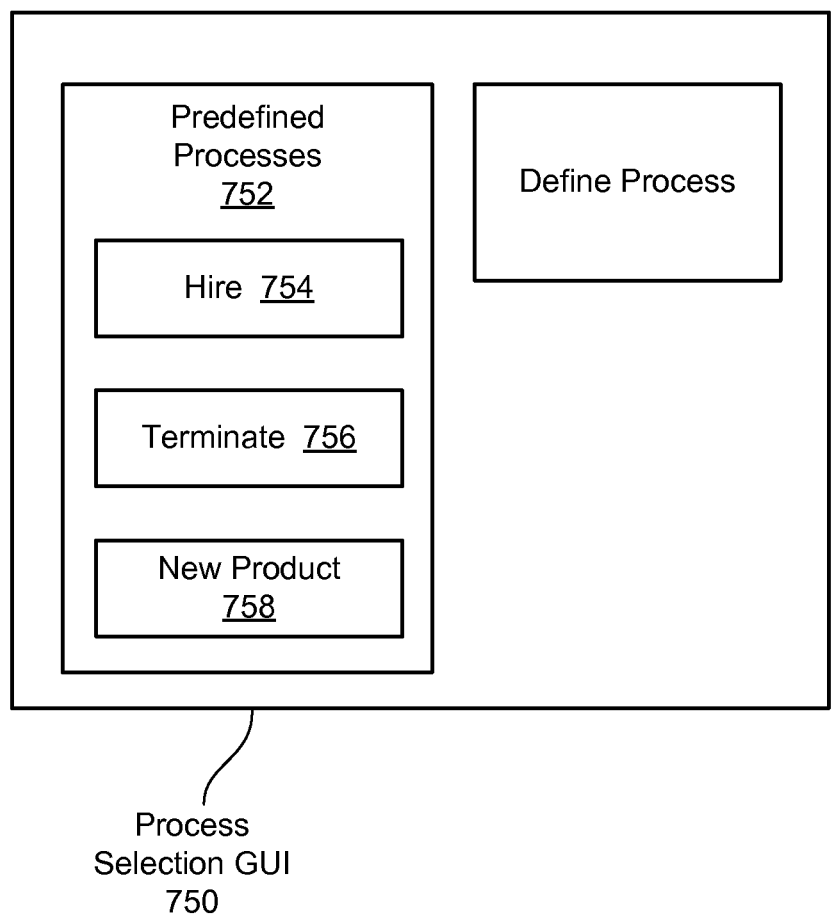
FIG. 7E is a diagram showing a process selection GUI according to an example implementation.

FIG. 7E is a diagram showing a process selection GUI 750 according to an example implementation. The creator or manager of the conversation may select a predefined process, or define a process, by interacting with the process selection GUI 750. The process selection GUI 750 may include a predefined processes section 752 and a define process section 760. The predefined processes section 752 may include multiple predefined processes. A predefined process may be retrieved from, for example, an Enterprise Resource Planning (ERP) system process configuration.

The predefined processes section 752 may display all predefined processes to the user, may show some of the predefined processes to the user, allowing the user to scroll through the processes to change which processes are displayed, and/or may include a search field allowing the user to search for predefined processes. In the example shown in FIG. 7E, the predefined process section 752 displays a hire process interactor 754, a terminate process interactor 756, and a new product process interactor 758. The interactors 754, 756, 758 may allow the user, such as the creator or manager of the conversation, to select an associated process by interacting with the interactors using a cursor by, for example, clicking or dragging on the interactor 754, 756, 758. The interactors 754, 756, 758 may include, for example, buttons.

The interactors 754, 756, 758 may display the tasks included in their associated processes in response to interaction by the user. For example, the interactors 754, 756, 758 may display the tasks in response to the user hovering a cursor over, or clicking the cursor on, the respective interactor 754, 756, 758.

Figure 7F:
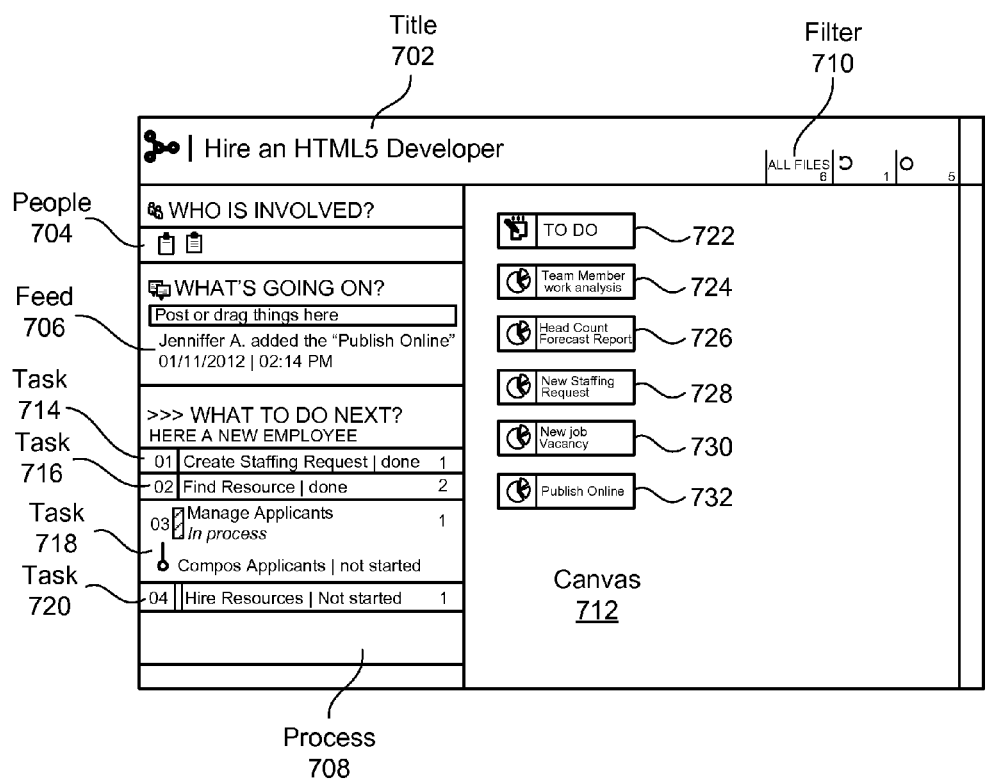
FIG. 7F is a diagram showing the conversation GUI after a process has been added according to an example embodiment.

FIG. 7F is a diagram showing the conversation GUI 700 after a process has been added according to an example implementation. In this example, the creator or manager of the conversation selected a process, "Hire a New Employee," which may have been associated with the hire interactor 754 shown in FIG. 7E.

In this example, the process section 708 includes four tasks which are parts of the process "Hire a New Employee" that is associated with the conversation. In this example, the tasks 714, 716, 718, 720 are "Create Staffing Request," "Find Resource," "Manage Applicants," and "Hire Resources." The process section 708 also indicates which tasks have been completed, are in process, or have not been started. In this example, "Create Staffing Request" 714 and "Find Resources" 716 are indicated as 'done' or completed. "Manage Applicants" 718 is indicated as 'In process,' with sub-task 'Compare Applicants' indicated as 'Not started,' and "Hire Resources" 720 is indicated as 'Not started.'

The process section 708 may display numbers for each displayed task 714, 716, 718, 720. In this example, the task 714 displays '1', the task 716 displays '2', the task 718 displays '1', and the task 720 displays '1'. The displayed numbers may represent a number of members assigned to the task, a number of documents associated with the task, or a number of messages associated with the task, according to example implementations.

In this example, the filter section 710 indicates that "All Files" should be displayed, and the canvas 712 includes six documents. The six documents may have been added to the conversation by any of the members (232 in FIG. 2, 402 or 430 in FIG. 4). The six documents in this example include a word processing document called "To Do" 722, a presentation document called "Team Member Work Analysis" 724, a presentation document called "Head Count Forecast Report" 726, a presentation document called "New Staffing Request" 728, a presentation document called "New Job Vacancy" 730, and a presentation document called "Publish Online" 732.

Figure 7G:
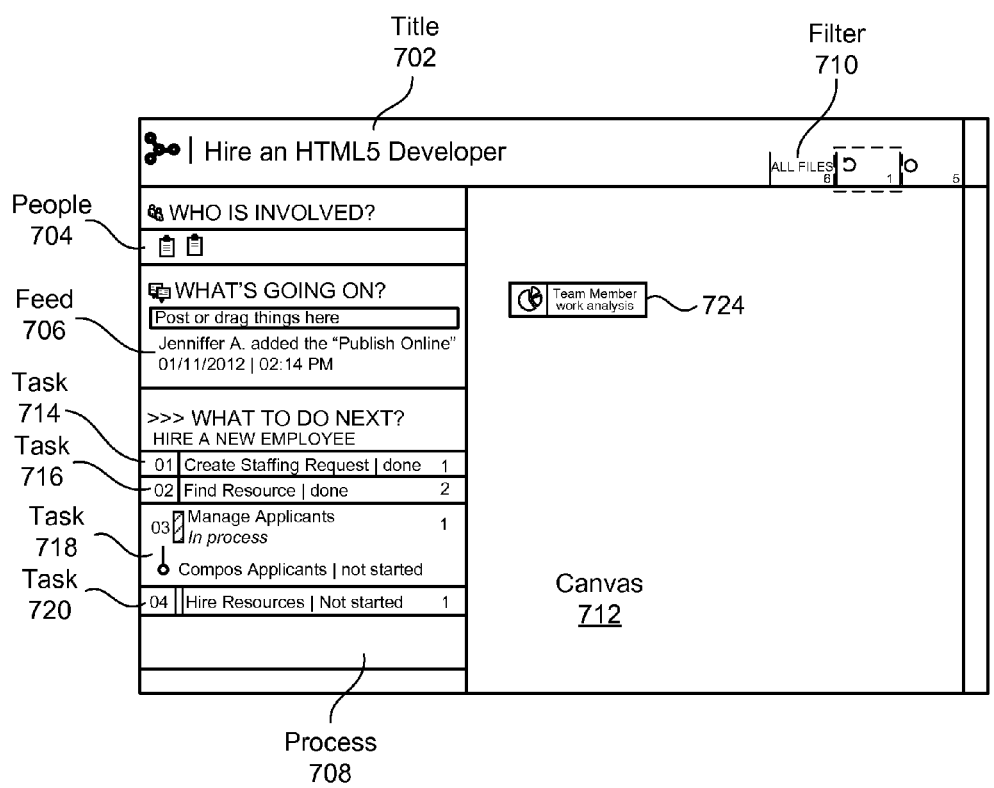
FIG. 7G is a diagram showing the conversation GUI after a filtering selection has been made according to an example implementation.

FIG. 7G is a diagram showing the conversation GUI 700 after a filtering selection has been made according to an example implementation. A user, who may include any member of the conversation, may have selected the task 718 "Manage Applicants," and made a selection in the filter section 710 to show only the documents in the canvas 712 that are associated with the selected task 718. Based on the user's selection of the task 718 and selection in the filter section 710 to show only the documents associated with the selected task 718, the canvas 712 may show only the documents that are associated with the selected task, and may hide the documents that are not associated with the selected task. In this example, the presentation document called "Team Member Work Analysis" 724 may be associated with the "Manage Applicants" task 718, and the canvas 712 may display the icon associated with the presentation document called "Team Member Work Analysis" 724. Also in this example, the word processing document called "To Do" 722, the presentation document called "Head Count Forecast Report" 726, the presentation document called "New Staffing Request" 728, the presentation document called "New Job Vacancy" 730, and the presentation document called "Publish Online" 732 may not be associated with the "Manage Applicants" task 718, and the canvas 712 may hide the icons 722, 726, 728, 730, 732 associated with these documents.

Figure 8A:
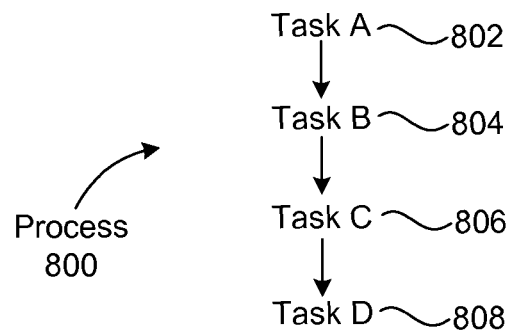
FIG. 8A is a diagram showing a process and relationships between tasks of the process according to an example implementation.

FIG. 8A is a diagram showing a process 800 and relationships between tasks 802, 804, 806, 808 of the process 800 according to an example implementation. In this example, the tasks 802, 804, 806, 808 may be serially related. For example, task B 804 may not be available for performance until task A 802 has been completed, task C 806 may not be available for performance until task B 804 has been completed, and task D may not be available for performance until task C 806 has been completed. The server 104 may inform members of the conversation that a task needs to be performed after a prerequisite task has been performed. For example, the server 104 may inform one or more members that task B 804 should be performed based on task A 802 being completed, may inform one or more members that task C 806 should be performed based on task B 804 being completed, and may inform one or more members that task D 808 should be performed based on task C 806 being completed.

Figure 8B:
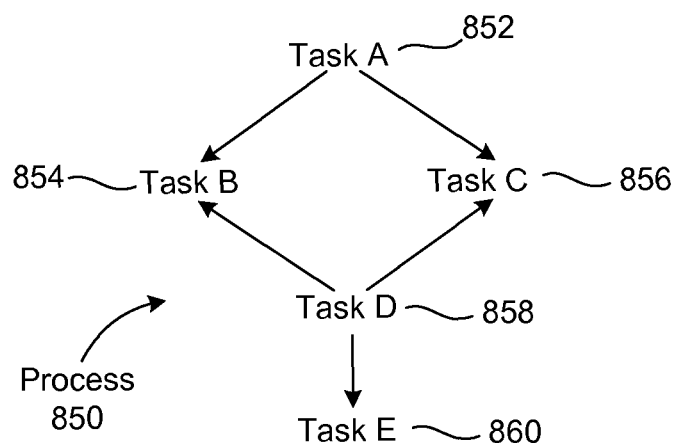
FIG. 8B is a diagram showing a process and relationships between tasks of the process according to another example implementation.

FIG. 8B is a diagram showing a process 850 and relationships between tasks 852, 854, 856, 858, 860 of the process 850 according to another example implementation. In this example, tasks B and C 854, 856 may be performed in parallel. Tasks B and C 854, 856 may be available for performance after task A 852 has been performed. The server 104 may, for example, notify one or more members of the conversation that tasks B and C 854, 856 should be performed based on task A 852 being completed.

Task D 858 may be available for performance only after both tasks B and C 854, 856 have been completed. The server 104 may, for example, notify one or more members of the conversation that task D should be performed based on both task B 854 and task C 856 being completed.

Task E 860 may be available for performance based on task D 858 being completed. The server 104 may notify one or more members of the conversation that task E should be performed based on task D being completed.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a local computing system to at least:
generate a conversation graphical user interface (GUI), the conversation GUI including:
a canvas configured to present icons associated with documents uploaded by members of a conversation associated with the GUI, each of the documents being associated with one of at least a first task and a second task associated with a specified process, the members including a local user of the local computing system and remote users of remote computing systems;
a feed section configured to present messages sent by the local user and by the remote users, each of the messages being associated with one of at least the first task and the second task; and
a process section, the process section being separate from the canvas and the feed section and including at least the first task and the second task; and upon completion of the first task, send a message to the local user indicating that the first task is complete and the second task is to be performed.

2. The storage medium of claim 1, wherein the process section further comprises at least one of a name of the first task, a name of the second task, a progress indication of the first task, a progress indication of the second task, a list of users associated with the first task, a list of users associated with the second task, a number corresponding to a number of documents associated with the first task, and a number corresponding to a number of documents associated with the second task.

3. The storage medium of claim 1, wherein the first task includes at least one of a description of the first task, a list of users associated with the first task, a description of what actions users from the list of users are to take with respect to the first task, where the first task is located within the specified process, and a status of the first task.

4. The storage medium of claim 1, wherein the message includes at least one of an overall progress of the specified process, a next action to take with respect to the second task, a list of users associated with the second task, and a link to the GUI.

5. The storage medium of claim 1, wherein the canvas is configured to present a new icon associated with a new document in response to the local user dragging an icon from a desktop of the local user's local computing system onto the canvas.

6. The storage medium of claim 1, wherein the conversation GUI is configured to update the feed section to present new messages from the local user and from the remote users without changing a location of the canvas in a fixed section of the conversation GUI.

7. The storage medium of claim 1, wherein the conversation GUI is further configured to hide icons within the canvas in response to the local user providing a filter input.

8. The storage medium of claim 1, wherein the conversation GUI is further configured to, in response to the local user dragging an icon from the canvas onto the first task in the process section, associate the document associated with the dragged icon with the first task onto which the icon was dragged.

9. The storage medium of claim 1, wherein the conversation GUI is further configured to, in response to the local user selecting one of the first task and the second task, present the icons that are associated with the documents associated with the selected task.

10. The storage medium of claim 1, wherein the conversation GUI is further configured to:
associate messages with one of the first and second tasks; and
in response to the local user selecting one of the first and second tasks, present the messages associated with the selected task.

11. The storage medium of claim 1, wherein:
the process section includes at least the first task, the second task, a third task, and a fourth task associated with the specified process; and
the instructions are configured to cause the local computing system to:
upon completion of the first task, send a message to the local user indicating that the first task is complete and the second and third tasks are to be performed; and
upon completion of the second and third tasks, send a message to the local user indicating that the fourth task is to be performed.

12. The storage medium of claim 1, wherein the conversation GUI is further configured to change an appearance of messages in the feed section that are associated with a selected task that the local user selects from the first and second tasks.

13. The storage medium of claim 1, wherein the conversation GUI is further configured to associate different sets of persons, selected from the local user and the remote users, with different tasks from the first and second tasks.

14. The storage medium of claim 1, wherein the conversation GUI is further configured to associate different sets of documents, selected from the documents associated with the icons presented by the canvas, with different tasks from the first and second tasks.

15. The storage medium of claim 1, wherein the conversation GUI is further configured to include a people section, the people section being separate from the canvas and the feed section and indicating the remote users.

16. The storage medium of claim 1, wherein the instructions are configured to cause the computing system to generate the conversation GUI in response to the local user dragging an icon associated with one of the remote users onto a document icon.

17. A non-transitory computer-readable storage medium comprising instructions stored thereon that, when executed by at least one processor, are configured to cause a server to at least:
generate a conversation in response to receiving a new conversation message from a local client;
send new conversation messages to remote clients in response to receiving a members message from the local client;
send task messages to the remote clients in response to receiving a request process message from the local client, the task messages indicating relationships between at least a first task and a second task based on a predefined process indicated by the request process message; and
based on a predetermined time period expiring, send a reminder message to at least one of the remote clients to complete a task.

18. The storage medium of claim 17, wherein the instructions are further configured to cause the server to send task update messages to the remote clients in response to receiving a complete message from the local client.

19. A method comprising:
generating, by a local computing system, a conversation graphical user interface (GUI), the conversation GUI including:
a canvas configured to present icons associated with documents uploaded by members of a conversation associated with the GUI, each of the documents being associated with one of at least a first task and a second task associated with a specified process, the members including a local user of the local computing system and remote users of remote computing systems;
a feed section configured to present messages sent by the local user and by the remote users, each of the messages being associated with one of at least the first task and the second task; and
a process section, the process section being separate from the canvas and the feed section and including at least the first task and the second task; and
upon completion of the first task, send a message to the local user indicating that the first task is complete and the second task is to be performed.

20. The storage medium of claim 17, wherein the instructions are configured to cause the server to send the reminder message to at least one of the remote clients to complete either the first task or the second task based on the predetermined time period expiring.

* * * * *